Sept. 3, 1968 E. E. McDONNELL 3,400,376
INFORMATION TRANSFER CONTROL SYSTEM
Filed Sept. 23, 1965 9 Sheets-Sheet 1

INVENTOR.
EUGENE E. Mc DONNELL
BY Ronald J. Kranzlow
ATTORNEY

Sept. 3, 1968 E. E. McDONNELL 3,400,376

INFORMATION TRANSFER CONTROL SYSTEM

Filed Sept. 23, 1965 9 Sheets-Sheet 2

Sept. 3, 1968 E. E. McDONNELL 3,400,376

INFORMATION TRANSFER CONTROL SYSTEM

Filed Sept. 23, 1965 9 Sheets-Sheet 4

FIG. 3

| FIG. 3A |
|---|
| FIG. 3B |

FIG. 3A

COLUMN

| STEP | A | B | C | D | E | F | G | H | I | J |
|---|---|---|---|---|---|---|---|---|---|---|
| | PROGRAM RUNNING | INSTRUCTION | A-ADDRESS | B-ADDRESS | ON CROSSBAR MATRIX 20 | FUNCTIONS<br>ON FUNCTION REGISTER 240 | ON ACCUMULATOR 330 | ON MASK MEMORY 480 | ON INSTRUCTION REGISTER 58 | ON MEMORY 80 |
| 1 | i | CONN | j | i | SET $C_{ji}$ | SET WRITE i FF | | SET PROPER MASK INTO SECOND i POSITION OF MASK MEMORY | | |
| 2 | j | CHEK | j | | READ OUT $C_j$ | | RESET AND SET $C_j$ INTO | | | |
| 3 | j | SENSE | j | | | | SENSE $C_i$ FOR ACCEPTABLE MATCH | READ OUT MASK IN 1ST. j POSITION OF MASK MEMORY | SET CONN INTO IF MATCH SENSE | |
| 4 | j | CONN | i | j | SET $C_{ij}$ | SET READ j FF | | SET PROPER MASK INTO THIRD j POSITION OF MASK MEMORY | | |

| | | | | | | | | | | |
|---|---|---|---|---|---|---|---|---|---|---|
| 5 | i | CHEK | i | | READ OUT $C_i$ | | RESET AND SET $C_i$ INTO | | | |
| 6 | i | SENSE | i | | | | SENSE $C_i$ FOR $C_{i,j}$ SET | READ OUT MASK IN 2ND. i POSITION IN MASK MEMORY AND RESET THIS POSITION | SET TALK INTO IF $C_{i,j}$ SET | |
| 7 | i | TALK | j | i | RESET $C_{j,i}$ | RESET WRITE i FF | | | | TRANSFER i DATA TO j PORTION OF BUFFER |
| 8 | j | CHEK | j | | READ OUT $C_j$ | | RESET AND SET $C_j$ INTO | | | |
| 9 | j | SENSE | j | | | | COMPLEMENT AND SENSE $C_j$ FOR $C_{j,i}$ RESET | READ OUT MASK IN 3RD. j POSITION IN MASK MEMORY AND RESET THIS POSITION | SET LISTEN INTO IF $C_{j,i}$ RESET | |
| 10 | j | LISTEN | i | j | RESET $C_{i,j}$ | RESET READ j FF | | | | TRANSFER DATA FROM j PORTION OF BUFFER TO MAIN MEMORY |

FIG. 3B

United States Patent Office 3,400,376
Patented Sept. 3, 1968

3,400,376
INFORMATION TRANSFER CONTROL SYSTEM

Eugene E. McDonnell, Yorktown Heights, N.Y., assignor to International Business Machines Corporation, Armonk, N.Y., a corporation of New York Filed Sept. 23, 1965, Ser. No. 489,588
9 Claims. (Cl. 340—172.5)

ABSTRACT OF THE DISCLOSURE

A system for exchanging information between instruction generating media such as computer programs or computer I/O terminals. The system includes a matrix storage device. When an indication is received that a first terminal or program wishes to send information to a second terminal or program, a first selected bit in the matrix storage device is set. When the second terminal is operating or the program is running, a determination is made as to whether the second terminal or program wishes to communicate with the first terminal or program respectively. If the latter determination is affirmative, a second selected bit is stored in the matrix storage device. When the first terminal is operating or the first program is thereafter running, the matrix storage device is interrogated to ascertain whether the information is to be sent and, in response to such ascertaining, causes the information to be transferred from a storage medium for the first terminal or program to a storage medium for the second terminal or program.

This invention relates to a system for controlling the exchange of information between instruction generating media and more particularly to a system for controlling intercommunication between computer programs.

Many large general purpose computers now being built have the capacity to operate on several programs at the same time with the system first running a portion of one program, then a portion of another, and so on. This ability is referred to as a multiprogramming capability. The programs which are run in this manner may be residing in the computer or a user at an I/O terminal may be communicating with the computer by applying a short instruction sequence to it, and waiting for an answer before applying another instruction sequence to the computer. In either of the modes of operation described above, there are many applications where the transfer of a block of information from one of the programs to the other or from one of the I/O terminals to another may be required. Such a situation would, for example, arise in a gaming situation such as a war game, teaching game, or industrial game where it is desired to keep each of the opponents apprised of the actions of the others. Another situation where there is a need for one program to communicate with another is where the computer is being used as a teaching machine. In this situation the student program or I/O terminal transfers answers to the master or teacher program and the master or teacher program transfers new questions or data to the student program or terminal. Still another situation in which interprogram communication is required is where the computer is being used for industrial monitoring and control. Data from remote terminals is applied to the computer, analyzed by a program for the particular terminal, and the results applied to a master control program. The master control program then applies information as to the courses of action to be taken to the terminal, generally through the program for that terminal. Other situations where an interprogram communication facility might be of value include the design team situation, where each designer wishes to keep the others apprised of any changes which he has made, the information retrieval situation where each of a variety of users may seek to send information to, or receive information from, a retrieval program, and testing situations where, for example, the results of various circuit operations are applied to a test program.

In many of the situations where one program is communicating with another or one user is communicating with another, it is important that the control system block the transfer of information from undesired programs or users. For example, in the teaching situation, the system must be capable of preventing students from exchanging messages between each other. By the same token, it is equally desirable that some programs or users be capable of entering any of the programs. This would be true, for example, for the computer monitor program or, in a teaching situation, for the teacher program.

It is therefore a primary object of this invention to provide an improved system for controlling communication between instruction generating media. One more specific object of this invention is to provide an improved system for controlling communication between computer programs or users.

Another object of this invention is to provide a control system of the type described above which is capable of blocking the transfer of information from an unwanted terminal or program.

In accordance with these objects this invention provides a system for exchanging information between two instruction generating media, such as, for example, computer programs or computer I/O terminals, which system includes a matrix storage device. When an indication is received that, for example, a first program wishes to send information to a second program, a selected bit in the matrix storage device is set. At a later time, when the second program is running, the matrix storage device is interrogated to determine if a bit indicating a desire to communicate with the second program has been set. If the bit has been set, a further determination may be made as to whether the sending program is one which the receiving program wishes to communicate with. If a bit is detected, and it is from a program which the receiving program wishes to communicate with, a bit is stored in a second selected position in the matrix storage device. When the sending program is again running it interrogates the matrix storage device to determine if its call has been answered, and, if it has been answered, causes the information to be transferred from a storage medium for the first program to a storage medium for the second program.

The foregoing in other objects, features and advantages of the invention will be apparent from the following more particular description of preferred embodiments of the invention as illustrated in the accompanying drawings.

FIGS. 2A–2F when combined, form a composite block diagram of a hardware embodiment of the system of this invention.

FIG. 3 is a diagram illustrating how FIGS. 3A–3B are combined to form a chart illustrating the operation of the hardware embodiment of the invention shown in FIGS. 2A–2F.

GENERAL DESCRIPTION

Figure 1:
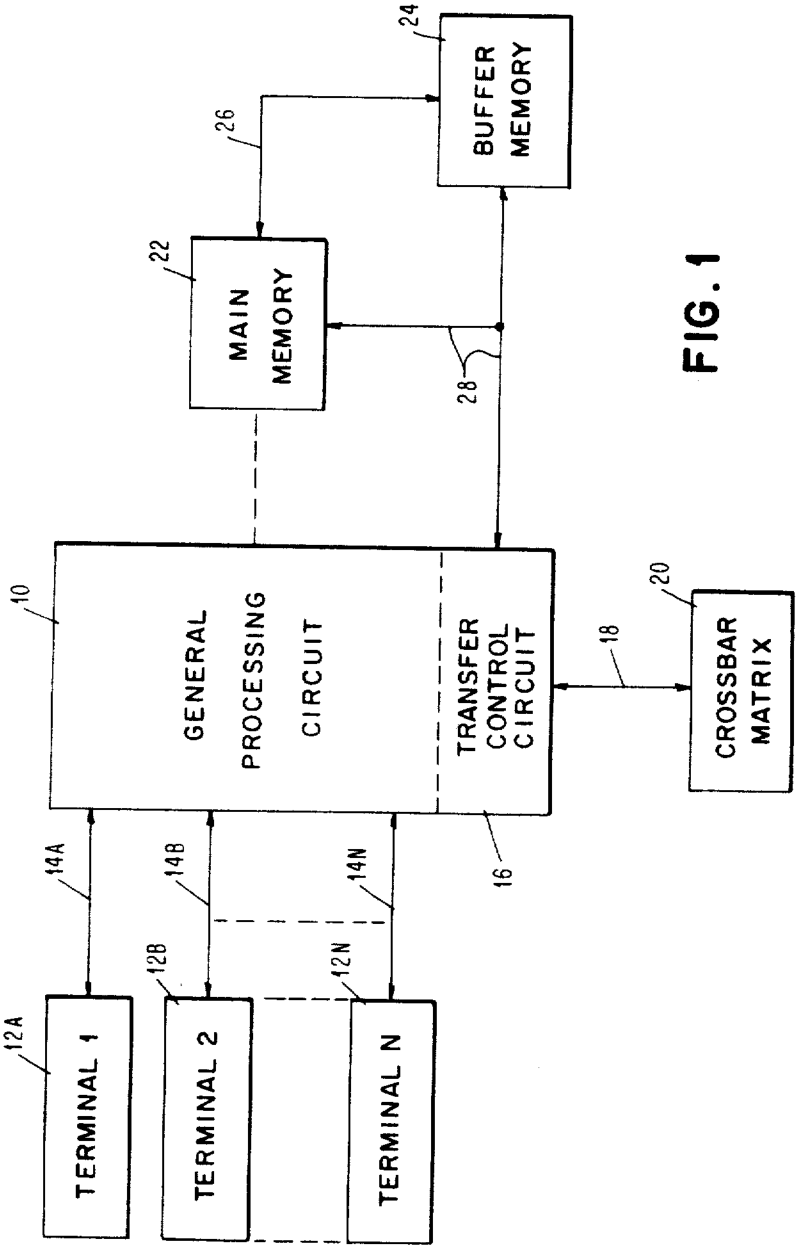
FIG. 1 is a generalized block diagram of the system of this invention.

Referring to FIG. 1 it is seen that the system includes a general processing circuit 10 which, from most applications, would be a general purpose digital computer.

This circuit may, for example, have a plurality of terminals 12A–12N communicating with it through lines 14A–14N respectively. Each terminal 12 would contain an I/O device and may also contain a small data processing device. The I/O device may operate under manual control or may respond to and control automatic circuitry at the remote terminal. The system also includes a transfer control circuit 16 which may, where the general processing circuit is a general purpose computer, be part thereof. Transfer control circuit 16 is connected through lines 18 to crossbar matrix 20. Crossbar matrix 20 has for the preferred embodiment of the invention a row and a column for each of the terminals 12 or each of the programs in general processing circuit 10 which wish to communicate with each other. Bits are set or reset in this matrix under control of transfer control circuit 16, in a manner to be described later, to indicate a desire of one terminal to communicate with another and to indicate the willingness of the second terminal to receive information from the first. General processing circuit 10 has a main memory 22 associated with it. The final element in the system shown in FIG. 1 is buffer memory 24. Information is exchanged between main memory 22 and buffer memory 24 through lines 26. The exchange of information between these memories is controlled by signals on lines 28 from transfer control circuit 16.

The system shown in FIG. 1 may be embodied in hardware, software, or a combination of both. In general, the system operation is the same for all embodiments. However, the various embodiments will present some differences in the details of the operation and these will be pointed out in the general description of operation to follow.

GENERAL DESCRIPTION OF OPERATION

For the following discussion it will be assumed that a terminal *i* wishes to communicate with a terminal *j*. It is to be understood that while this discussion will be with reference to terminals, what is said will apply equally if a program *i* wishes to communicate with a program *j*. The first step in the operation is for the terminal *i* to generate a CONN instruction. This may be accomplished either by the terminal transferring this instruction to the general processing circuit, or by this instruction being included in a program in the general processing circuit for terminal *i*. When this instruction is detected by transfer control circuit 16 it causes signals to be applied through lines 18 to store a bit in the row *j*, column *i* (C*ji*) position in crossbar matrix 20. At a later time, terminal *j* interrogates crossbar matrix 20 by applying a CHEK instruction to the general processing circuit. Again, the issuing of the CHEK instruction may be accomplished by having CHEK instructions interspersed in the normal program sequence of the program for terminal *j*. The CHEK instruction causes the *j* row to be read out from crossbar matrix 20 into transfer control circuit 16. Suitable instructions are then issued by program *j* to cause a decision to be made as to whether another terminal wishes to communicate with it and whether it is willing to accept communications from this terminal. Methods differing slightly in detail for accomplishing this determination both in hardware and software will be described later. If a decision is made that terminal *j* wishes to accept information from terminal *i*, terminal *j* issues a CONN instruction which causes signals to be applied through lines 18 to set the row *i*, column *j* (C*ij*) bit in crossbar matrix 20.

Nothing further happens until the *i* terminal or the program associated therewith issues a CHEK instruction which causes the *i* row in crossbar matrix 20 to be read into transfer control circuit 16. The transfer control circuit then looks at this word to see if the C*ij* bit has been set indicating that its call has been answered and, if its call has been answered, it issues a TALK instruction. The manner in which the above determination is made differs slightly in the hardware and software embodiment and both will be described in the sections to follow. The TALK instruction causes signals to be applied to line 18 causing the C*ji* bit to be reset and also causes signals to be applied to lines 28 to cause the data which the *i* terminal wishes to transfer to be read out of main memory 22 through lines 26 to the *j* portion of buffer memory 24.

When this operation has been completed nothing further happens until the *j* terminal or the program associated therewith issues a CHEK instruction to determine if the C*ji* bit in crossbar matrix 20 has been reset indicating that information has been transferred into its buffer. The CHEK instruction causes the *j* row in crossbar matrix 20 to be read into transfer control circuit 16 where a decision is made in manners differing in detail for the hardware and software embodiments to be described later as to whether the C*ji* bit has been reset. If the C*ji* bit has been reset, the *j* terminal or the program associated therewith issues a LISTEN instruction which causes signals to be applied to lines 18 to reset the C*ij* bit and signals to be applied to lines 28 to cause the information in the *j* portion of buffer 24 to be transferred into a designated position in main memory 22.

As indicated previously, equivalent implementations of the system shown in FIG. 1 may be provided either in hardware or in software. FIGS. 2A–2F and the sections to follow illustrate a hardware implementation of the system.

DETAILED CIRCUIT DESCRIPTION

Figures 2, 2A:
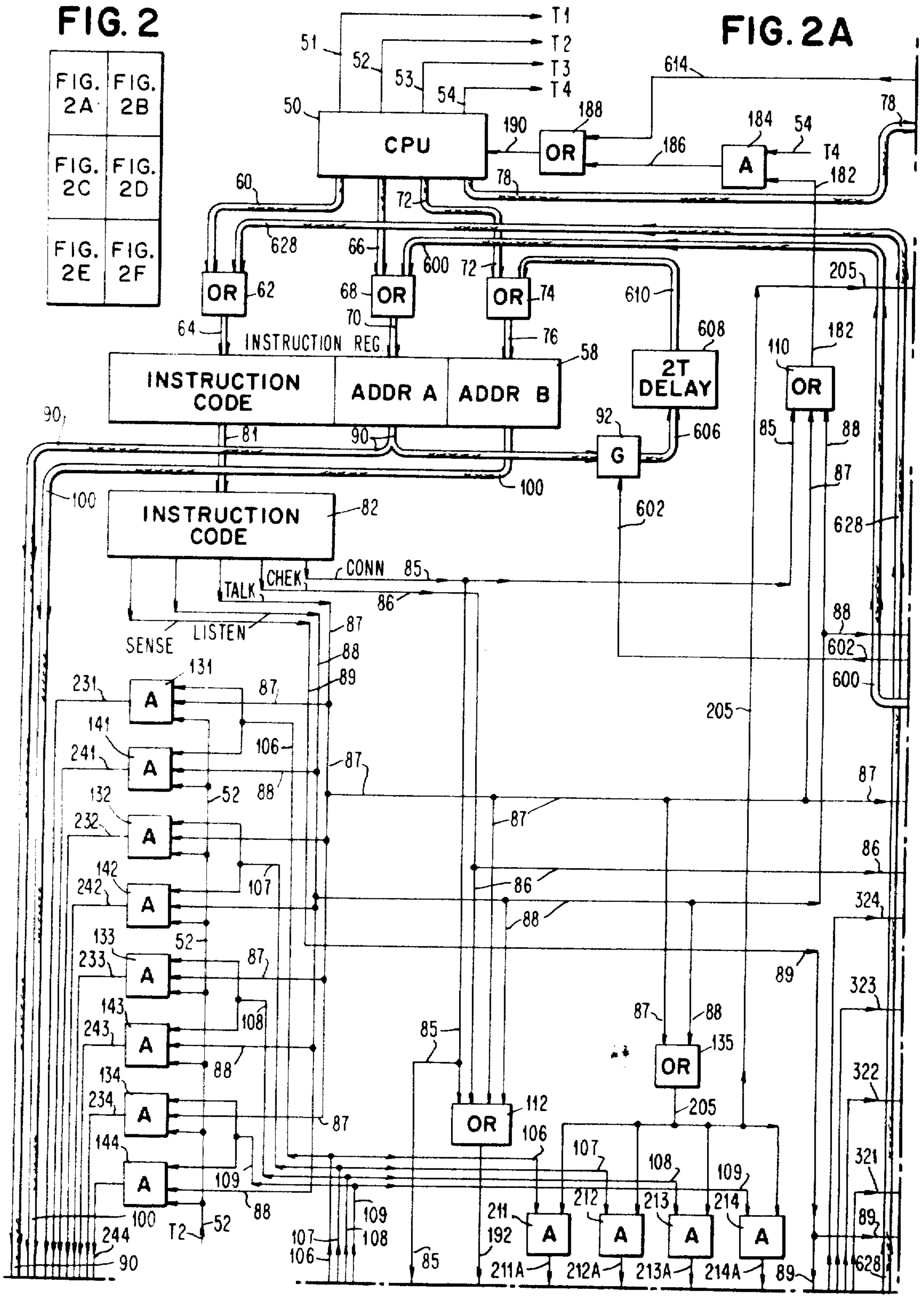
FIG. 2 is a diagram illustrating how
FIGS. 2A–2F are combined to form a composite block diagram of a hardware embodiment of the system of this invention.

FIGS. 2A–2F show a special purpose computer system which operates in conjunction with a central processing unit (CPU) to perform the interprogram communication function of this invention. Referring first to FIG. 2A, it is seen that CPU 50 generates, among other things, clock pulses T1–T4 on lines 51–54 respectively. Pulses appear on lines 51–54 in a cyclic manner with a pulse appearing on only one of the lines at any given time. The fall of a pulse on T4 line 54 is followed by a pulse on T1 line 51. The various points in the circuit of FIGS. 2A–2F to which the lines 51–54 are connected will be described later.

CPU 50 also applies instructions to instruction register 58. The transfer of instructions is accomplished at the fall of the T4 clock pulse. The instruction code portion of the instruction is transferred through lines 60, OR gates 62, and lines 64. The address A portion of the instruction is transferred through lines 66, OR gates 68, and lines 70. The address B portion of the instruction is transferred through lines 72, OR gates 74, and lines 76. The final output from CPU 50 is lines 78 which are connected to store in the appropriate one of program address registers 79 (FIG. 2B) the address in main memory 80 at which the memory block allocated to each of the programs begins. The loading of registers 79 is an internal function of the CPU and may be controlled in any standard fashion.

Output lines 81 from the instruction field of instruction register 58 (FIG. 2A) are connected as the inputs to operation decoder 82. Since five instructions are involved in the program intercommunication operation of this system, decoder 82 has five output lines 85–89. A signal appears on output line 85 from decoder 82 when a connect (CONN) instruction is in instruction register 58. A signal appears on output line 86 when a CHEK instruction is in the instruction register, on output line 87 when a TALK instruction is in the instruction register, on output line 88 when a LISTEN instruction is in the instruction register, and on output line 89 when a SENSE instruction is in the instruction register.

Figure 2B:
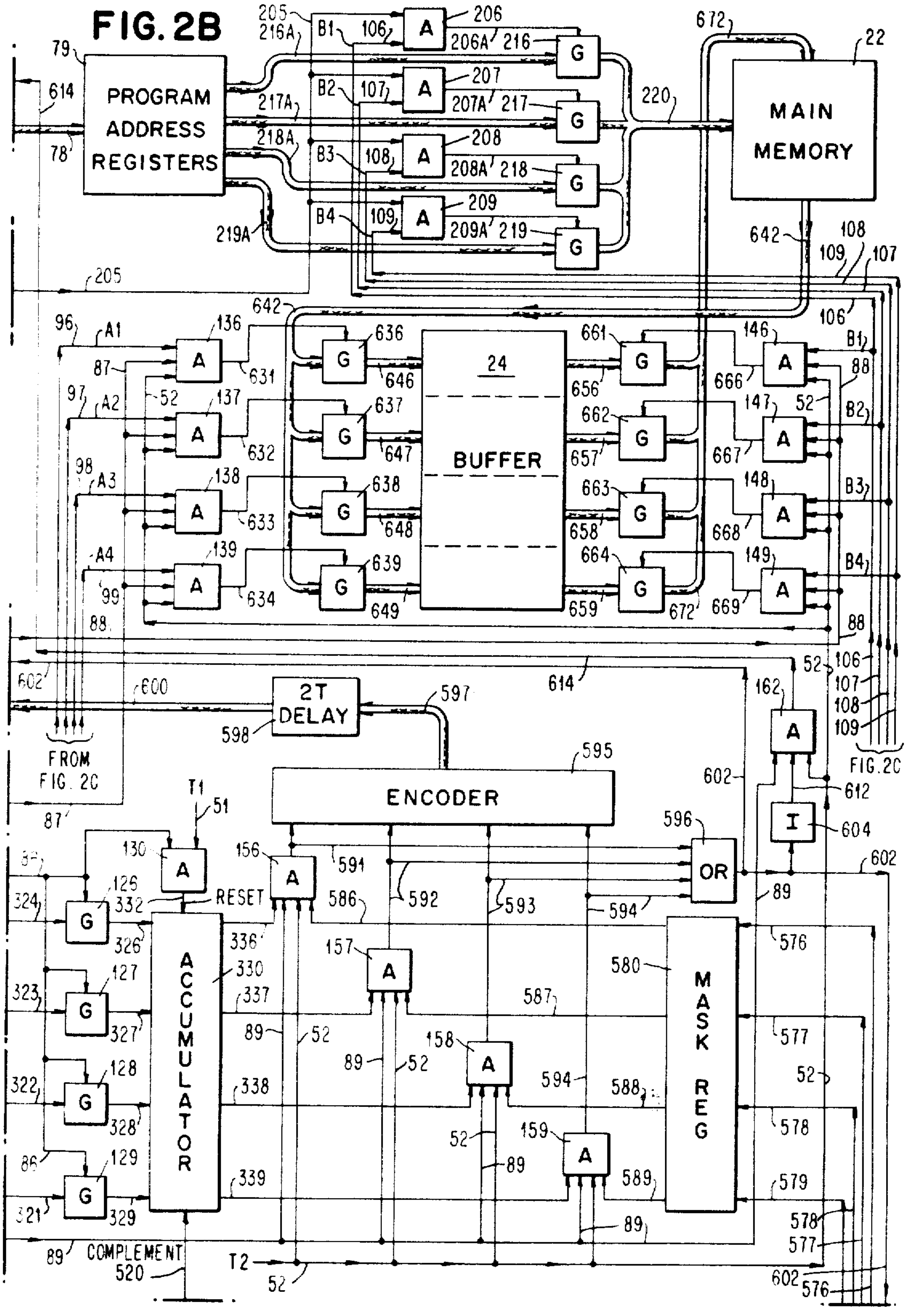
Figure 2C:
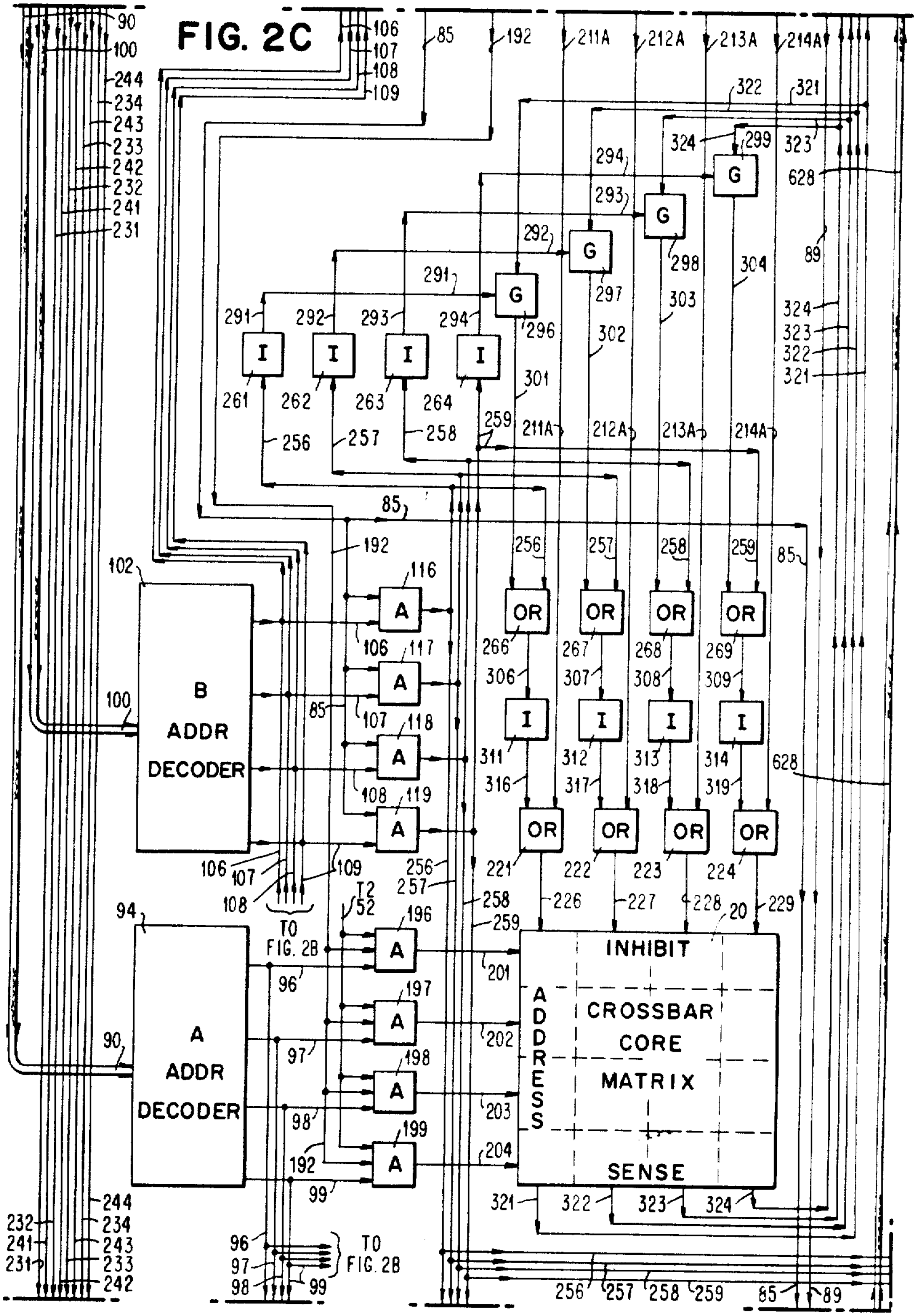

Output lines 90 of the address A portion of instruction register 58 are connected as the information inputs to gates 92 and as the inputs to A address decoder 94 (FIG. 2C). For the embodiment of the invention shown in FIGS. 2A–2F it has been assumed that there are only four programs which are communicating with each other and decoder 94 therefore has four output lines 96–99. Output lines 100 from the address B portion of instruction register 58 (FIG. 2A) are connected as the inputs to B address decoder 102 (FIG. 2C). B address decoder 102 has four output lines 106–109.

Figure 2D:
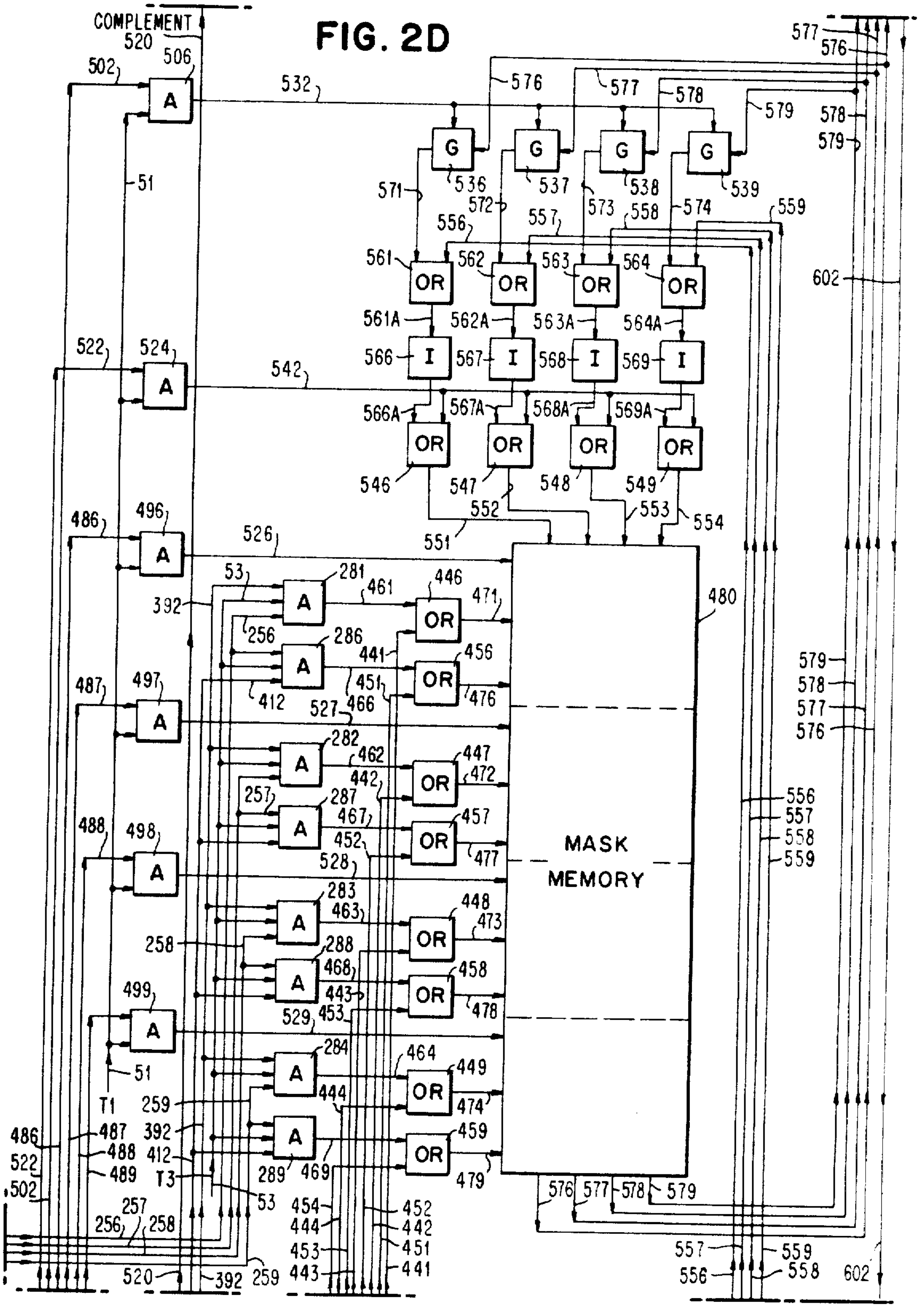
Figure 2E:
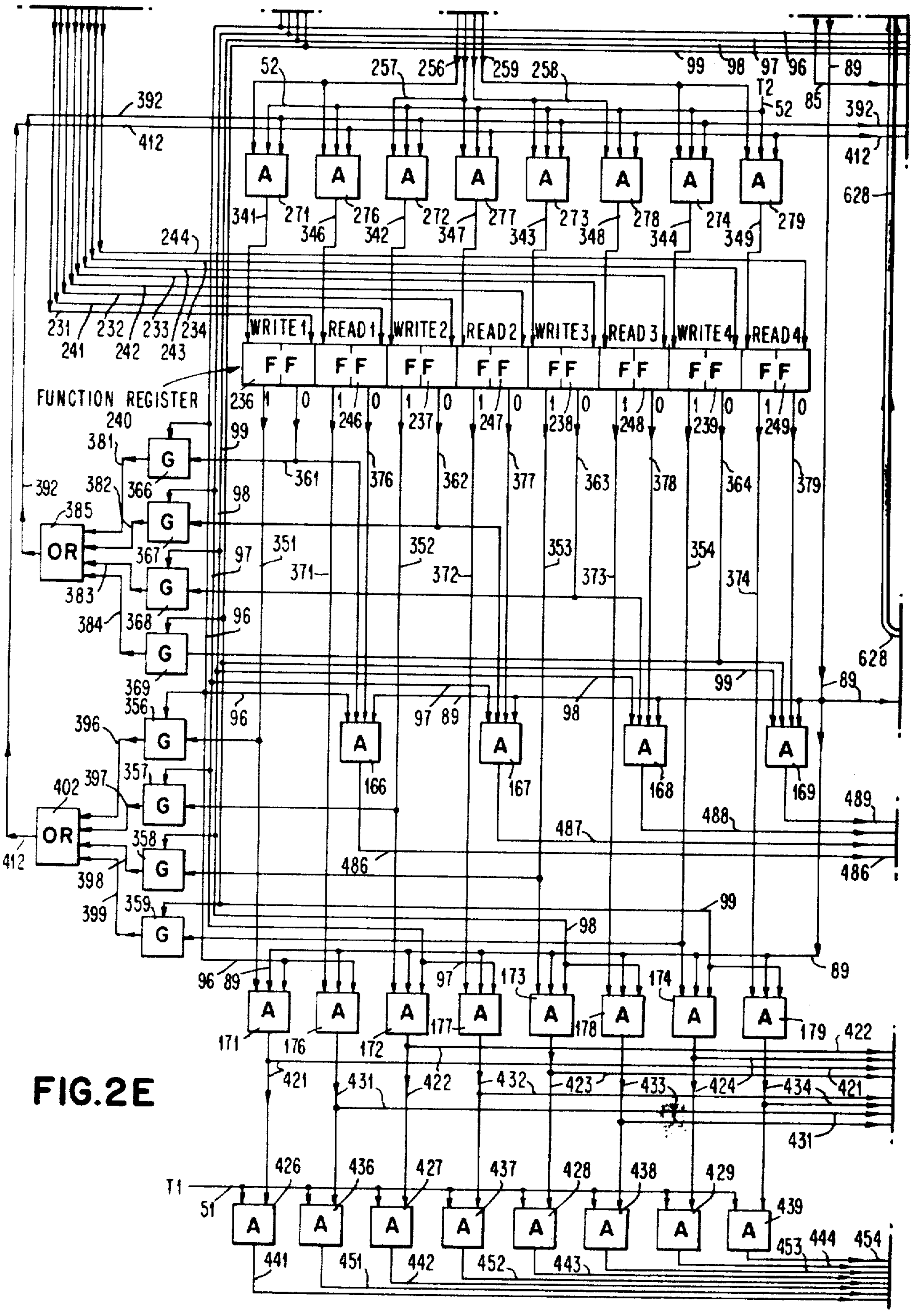
Figure 2F:
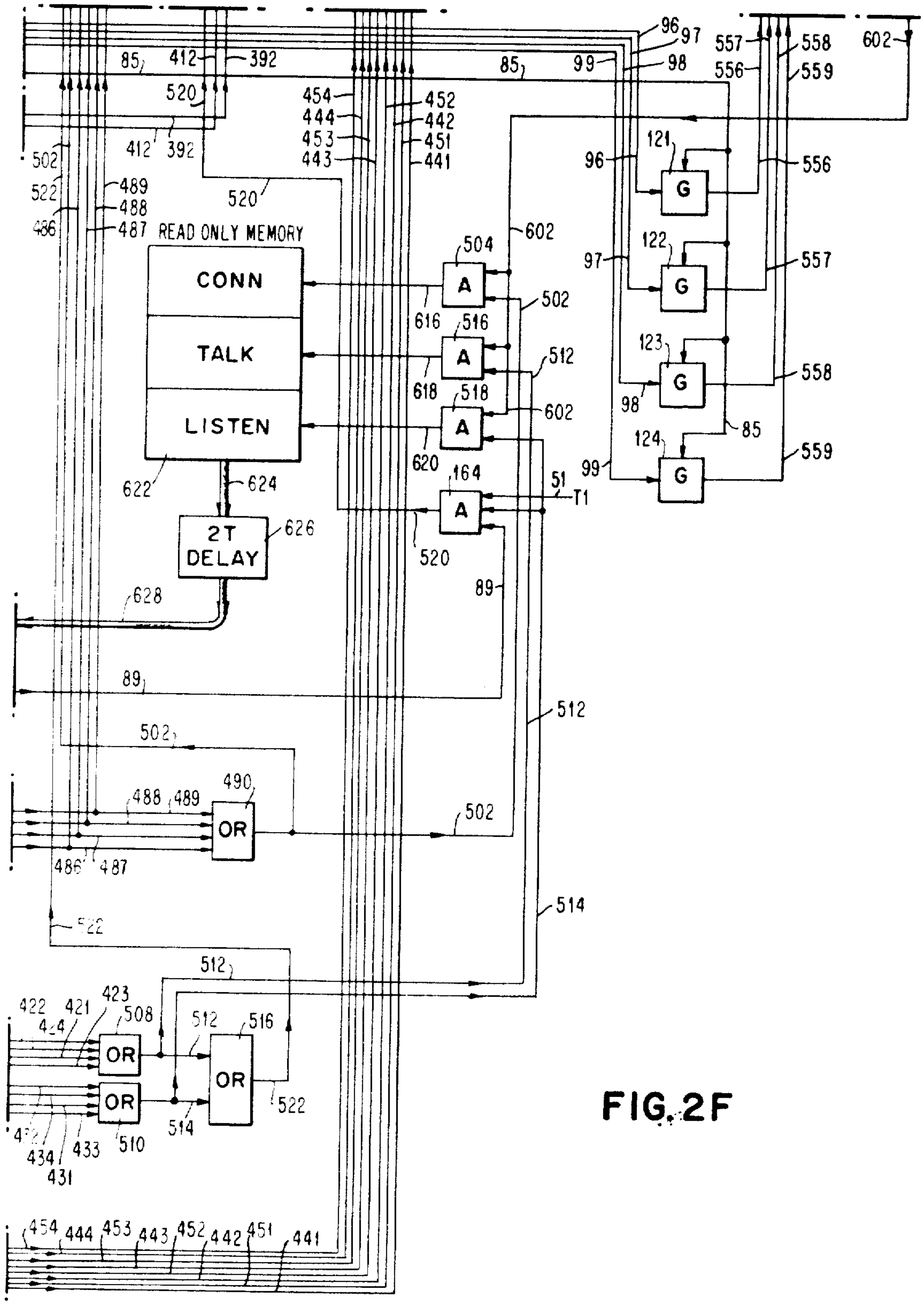

CONN line 85 from decoder 82 (FIG. 2A) is connected as one input to OR gates 110 and 112, as one input to AND gates 116–119 (FIG. 2C) and as the conditioning input to gates 121–124 (FIG. 2F). CHEK line 86 from decoder 82 (FIG. 2A) is connected as a second input to OR gate 112, as the conditioning input to gates 126–129 (FIG. 2B), and as one input to AND gate 130. TALK line 87 from decoder 82 is connected as an input to AND gates 131–134, as a third input to OR gate 112, as a second input to OR gate 110, as an input to OR gate 135, and as an input to AND gates 136–139 (FIG. 2B). LISTEN line 88 from decoder 82 (FIG. 2A) is connected as one input to AND gates 141–144, as the final input to OR gates 110, 112, and 135, and as one input to AND gates 146–149 (FIG. 2B). SENSE line 89 from decoder 82 (FIG. 2A) is connected as one input to AND gates 156–159 (FIG. 2B), as one input to AND gate 162, as one input to AND gate 164 (FIG. 2F) as one input to AND gates 166–169 (FIG. 2E), as one input to AND gates 171–174 and as one input to AND gates 176–179.

Output line 182 from OR gate 110 FIG. 2A) is connected as one input to AND gate 184, the other input to this AND gate being T4 line 54. Output line 186 from AND gate 184 is connected as one input to OR gate 188. The other input to OR gate 188 will be described later. Output line 190 from OR gate 188 is connected as an input to CPU 50. A signal on line 190 causes CPU 50 to, at the end of T4 time, apply the next instruction in its normal program sequence to instruction register 58.

Output line 192 from OR gate 112 (FIG. 2A) is connected as one input to AND gates 196–199 (FIG. 2C). A second set of inputs to AND gates 196–199 are output lines 96–99 respectively from A address decoder 94. The final input to AND gates 196–199 is T2 line 52. Output lines 201–204 from AND gates 196–199 respectively are connected as the address inputs to crossbar core matrix 20. Matrix 20 may, for example, be a four by four array of magnetic cores with suitable drive and inhibit circuits. A signal on a line 201–204 causes a read-write access to the corresponding row of the core matrix.

Output line 205 from OR gate 135 (FIG. 2A) is connected as one input to AND gates 206–209 (FIG. 2B) and AND gates 211–214 (FIG. 2A). The other inputs to each of these sets of AND gates are output lines 106–109 respectively from B address decoder 102. Output lines 206A–209A from AND gates 206–209 respectively are connected as the conditioning inputs to gates 216–219. The information inputs to gates 216–219 are the addresses on output lines 216A–219A respectively from program address registers 79. Output lines 220 from gates 216–219 are connected to the address inputs of main memory 22. Output lines 211A–214A from AND gates 211–214 respectively are connected as one set of inputs to OR gates 221–224 (FIG. 2C). The other set of inputs to OR gates 221–224 will be described later. Output lines 226–229 from OR gates 221-224 respectively are connected as the inhibit inputs to crossbar core matrix 20. During the write portion of a read-write cycle of the matrix a signal on a line 226–229 prevents the storing of a bit in the corresponding bit position or, in other words, causes the writing of a zero.

Output lines 106–109 from B address decoder 102 are also connected as a second input to AND gates 131–134 (FIG. 2A), 141–144, and 146–149 (FIG. 2B). The other input to AND gates 131–134 and 141–144 is T2 line 52. Output lines 231–234 from AND gates 131–134 respectively are connected to the ZERO-side inputs of write flip-flops 236–239 (FIG. 2E) of function register 240. Output lines 241–244 from AND gates 141–144 respectively are connected to the ZERO-side inputs of read flip-flops 246–249 of function register 240.

Output lines 256–259 from AND gates 116–119 (FIG. 2C) respectively are connected as the inputs to inverters 261–264, as one set of inputs to OR gates 266–269, as one set of inputs to AND gates 271–274 (FIG. 2E), as one set of inputs to AND gates 276–279, as one set of inputs to AND gates 281–284 (FIG. 2D), and as one set of inputs to AND gates 286–289. Output lines 291–294 from inverters 261–264 respectively (FIG. 2C) are connected as the conditioning inputs to gates 296–299. Output lines 301–304 from gates 296–299 respectively are connected as the second set of inputs to OR gates 266–269. Output line 306–309 from OR gates 266–269 respectively are connected as the inputs to inverters 311–314. Output lines 316–319 from inverters 311–314 respectively are connected as the other set of inputs to OR gates 221–224.

Sense output lines 321–324 from crossbar core matrix 20 (FIG. 2C) are connected as the information inputs to gates 296–299 and gates 126–129 (FIG. 2B). Output lines 326–329 from gates 126–129 respectively are connected as the inputs to accumulator 330. Accumulator 330 is reset by a signal on output line 332 from AND gate 130. The second input to AND gate 130 is T1 line 51. Output lines 336–339 from accumulator 330 are connected as a second set of inputs to AND gates 156–159 respectively.

Referring now to FIG. 2E it is seen that the final input to AND gates 271–274 and 276–279 is T2 line 52. Output lines 341–344 from AND gates 271–274 respectively are connected as the ONE-side inputs to write flip-flops 236–239 of function register 240. Output lines 346–349 from AND gates 276–279 respectively are connected as the ONE-side inputs to read flip-flops 246–249 of function register 240. Output lines 351–354 from the ONE side of flip-flops 236–239 are connected as a second set of inputs to AND gates 171–174 and as the information inputs to gates 356–359. Output lines 361–364 from the ZERO side of write flip-flops 236–239 are connected as a second set of inputs to AND gates 166–169 and as the information inputs to gates 366–369. Output lines 371–374 from the ONE side of read flip-flops 246–249 are connected as a second set of inputs to AND gates 176–179 respectively and output lines 376–379 from the ZERO side of these flip-flops are connected as a third set of inputs to AND gates 166–169. The conditioning inputs to gates 356–359, and 366–369, and the final set of inputs to AND gates 166–169, 171–174, and 176–179 are output lines 96–99 from A address decoder 94 (FIG. 2C). Lines 96–99 are also connected as the information inputs to gates 121–124 (FIG. 2F) and as a second set of inputs to AND gates 136–139 (FIG. 2B).

Output lines 381–384 from gates 366–369 (FIG. 2E) respectively are connected as the inputs to OR gate 385. Output line 392 from OR gates 385 is connected as the final input to AND gates 371–374, and as a second input to AND gates 281–284 (FIG. 2D). Output lines 396–399 from gates 356–359 (FIG. 2E) are connected as the inputs to OR gate 402. Output line 412 from OR gate 402 is connected as the final input to AND gates 276–279, and as a second input to AND gates 286–289 (FIG. 2D).

Output lines 421–424 from AND gates 171–174 (FIG. 2E) are connected as one set of inputs to AND gates 426–429 and output lines 431–434 from AND gates 176–179 respectively are connected as one set of inputs to AND gates 436–439. The other input to AND gates 426–429, and 436–439 is T1 line 51. Output line 441–444 from AND gates 426–429 respectively are connected as one set of inputs to OR gates 446–449 (FIG. 2D) and output lines 451–454 from AND gates 436–439 respectively are connected as one set of inputs to OR gate 456–459. The final input to AND gates 281–284 and 286–289 is T3 line 53. Output lines 461–464 from AND gates 281–284 are connected as the other set of inputs to OR gates 446–449 and output lines 446–469 from AND gates 286–289 respectively are connected as the other set of inputs to OR gates 456–459. Output lines 471–474 from OR gates 446–449 respectively and output lines 476–479 from OR gates 456–459 respectively are connected as the access inputs (address inputs) to the second and third memory positions respectively in mask memory 480 for each of the four programs which are communicating with each other.

Referring again to FIG. 2E it is seen that output lines 486–489 from AND gates 166–169 respectively are connected as the inputs to OR gate 490 (FIG. 2F) and as one set of inputs to AND gates 496–499 (FIG. 2D). Output line 502 from OR gate 490 is connected as one input to AND gate 504 and as one input to AND gate 506 (FIG. 2D). Output lines 421–424 from AND gates 171–174 (FIG. 2E) are also connected as the inputs to OR gate 508 (FIG. 2F) and output lines 431–434 from AND gates 176–179 are also connected as the inputs to OR gate 510. Output lines 512 and 514 from OR gate 508 and 510 respectively are connected as the inputs to OR gate 516. Line 512 is also connected as one input to AND gate 516 and line 514 is also connected as one input to AND gates 518 and 164. The final input to AND gate 164 is T1 line 51. Output line 520 from AND gate 164 is connected as the complement input to accumulator 330 (FIG. 2B). Output line 522 from OR gate 516 is connected as one input to AND gate 524 (FIG. 2D).

The final input to AND gates 496–499 (FIG. 2D), 506 and 524 is T1 line 51. Output lines 526–529 from AND gates 496–499 respectively are connected as the access inputs to the first address positions for each of the programs in mask memory 480. The mask stored at this position is the mask for the programs which the indicated program is willing to communicate with. Output line 532 from AND gate 506 is connected as the conditioning input to gates 536–539. Output line 542 from AND gate 524 is connected as one input to OR gates 546–549. Output lines 551–554 from OR gates 546–549 respectively are connected as the inhibit inputs to mask memory 480.

Referring now to FIG. 2F it is seen that output lines 556–559 from gates 121–124 respectively are connected as one set of inputs to OR gates 561–564 (FIG. 2D). Output lines 561A–564A from OR gates 561–564 are connected as the inputs to inverters 566–569. Output lines 566A–569A from inverters 566–569 are connected as the other set of inputs to OR gates 546–549. The other set of inputs to OR gates 561–564 are output lines 571–574 from gates 536–539 respectively. The information inputs to gates 536–539 are sense lines 576–579 from mask memory 480. Lines 576–579 are also connected as the inputs to mask register 580 (FIG. 2B). Output lines 586–589 from mask register 580 are connected as a third set of inputs to AND gates 156–159. T2 line 52 is the final input to AND gates 156–159, AND gates 136–139, and AND gates 146–149, and is a second input to AND gate 162. Output lines 591–594 from AND gates 156–159 respectively are connected as the inputs to encoder 595 and OR gate 596. Encoder 595 converts the signal applied to it into the code for one of the four programs being serviced by the system and applies this code through lines 597, delay 598, and lines 600 to OR gates 68 (FIG. 2A) leading to the address A field of instruction register 58. The duration of delay 598 is equal to the duration of two of the clock pulses T1–T4. Output line 602 from OR gate 596 is connected as the conditioning input to gates 92 (FIG. 2A) as the input to inverter 604 (FIG. 2B), and as the final input to AND gates 504 (FIG. 2F), 516, and 518. Output lines 606 from gates 92 (FIG. 2A) are connected through 2T delay 608 and lines 610 to OR gates 74 leading to the address B field of instruction register 58. Output line 612 from inverter 604 (FIG. 2B) is connected as the final input to AND gate 162. Output line 614 from AND gate 162 is connected as the other inputs to OR gate 188 (FIG. 2A). Output lines 616, 618, and 620 from AND gates 504, 516, and 518 respectively (FIG. 2F) are connected to read out the three address positions in read only memory 622. The code for the CONN instruction is stored in the first of these address positions, the code for the TALK instruction in the second of these address positions and the code for the LISTEN instruction in the third of these address positions. Output lines 624 from read only memory 622 are connected through 2T delay 626 and lines 628 as the other set of inputs to OR gates 62 (FIG. 2A) leading to the instruction field of instruction register 58.

Output lines 631–634 from AND gates 136–139 (FIG. 2B) are connected as conditioning inputs to gate 636–639 respectively. The information inputs to gates 636–639 are output lines 642 from main memory 22. Output lines 646–649 from gates 636–639 respectively are connected as the inputs to the portions of buffer memory 24 for the particular programs which desire to communicate with each other. There is a section in buffer 24 reserved for each of these programs. Buffer 24 may, for example, be a magnetic drum, with the lines 646–649 being applied to the read heads for the particular sections of the drum. Output lines 656–659 from the various buffer portions of buffer 24, which lines may for example be attached to the read heads of a magnetic drum, are connected as the information inputs to gates 661–664 respectively. The conditioning inputs to gates 661–664 are output lines 666–669 respectively from AND gates 146–149. Output lines 672 from gates 661–664 are connected as the information inputs to main memory 22.

DETAILED DESCRIPTION OF OPERATION

FIGS. 3A–3B show the sequence of instructions and operations which are required when a program *i* wishes to communicate with a program *j*. For purposes of illustrating the operation of the circuit of FIGS. 2A–2F, it will be assumed that the *i*, or sending, program is Program II and that the *j*, or receiving, program is Program III.

It will initially be assumed that crossbar matrix 20 (FIG. 2C) has all its bits reset to zero, all the flip-flops of function register 240 (FIG. 2E) are reset to their ZERO state, buffer 24 (FIG. 2B) is empty, accumulator 330 and mask register 580 are reset, the first position in mask memory 480 (FIG. 2D) for each program contains the mask of the programs which that program is willing to communicate with, and the remaining positions in mask memory 480 are reset.

It will further be assumed that the *i* program, Program II, is initially running on CPU 50 (FIG. 2A). As may be seen from the first line of FIG. 3A, the information transfer operation is initiated when program *i* causes the CPU to apply a CONN instruction to instruction register 58. Since it is assumed that program *i* is Program II and program *j* is Program III, the presence of the CONN instruction in instruction register 58 causes instruction decoder 82 to generate an output signal on CONN line 85, causes A address decoder 94 (FIG. 2C) to generate an output signal on line 98 corresponding to the *j* address, and causes B address decoder 102 to generate an output signal on line 107 (corresponding to the *i* address). The signals on lines 85 and 107 fully condition AND gate 117 (FIG. 2C) to generate an output signal on line 257 which is applied to one input of inverter 262, to one input of AND gate 272 (FIG. 2E), to one input of AND gate 282 (FIG. 2D), and through OR gate 267 (FIG. 2C) inverter 312 and OR gate 222 to inhibit input 227 of crossbar core matrix 20. The signal on line 85 is also applied through OR gate 112 (FIG. 2A) and line 192 to one input of AND gate 198 (FIG. 2C). A second input to AND gate 198 is the beforementioned output line 98 from A address decoder 94. At T2 time AND gate 198 is fully conditioned by the signal applied to line 52 to generate an output signal on line 203 which is applied to read out the third row of crossbar core matrix 20. The resulting output signals on lines 321–324 are applied to the information inputs of gates 296–299 respectively. Gates 296, 298, and 299 are conditioned by the outputs from inverters 261, 263, and 264 respectively causing the information read out of the first, third, and fourth positions of matrix 20 to be applied through these gates, OR gates 266, 268, and 269 and inverters 311, 313, and 314 to one input of OR gates 221, 223, and 224. It has been assumed that all positions in matrix 20 are initially set to zero. This means that one bits are applied to lines 226, 228, and 229 while, as indicated previously, the bit on line 257 causes a zero bit to be applied to inhibit line 227. During the write cycle of the read-write driver energized by the signal on line 203, writing is inhibited in all except the second position of the third row of matrix 20. A bit is in this manner stored in the C23 (C*ji*) position of crossbar matrix 20.

It has been assumed that all flip-flops in function register 240 (FIG. 2E) are initially reset to zero. There is therefore an output signal on output line 363 from the ZERO side of the write 3 trigger 238 which signal is applied to the information input of gate 368. This gate is conditioned by the signal on line 98 causing an output signal on line 383 which is applied through OR gate 385 and line 392 as a second input to AND gate 272, and as a second input to AND gate 282 (FIG. 2D). The final input to AND gate 272 is T2 line 52. Therefore, at T2 time, AND gate 272 is fully conditioned to generate an output signal on line 342 which is applied to set write 2 flip-flop 237 to its ONE state. The signal on CONN line 85 is also applied to condition gates 121–124 (FIG. 2F) to pass the output from A address decoder 94 on lines 96–99 (in this case a one bit on line 98 and a zero bit on the other three lines) to lines 556–559. The signals on lines 556–559 are applied through OR gates 561–564 (FIG. 2D), inverters 566–569 and OR gates 546–549 to the inhibit inputs of mask memory 480. For the example chosen there is at this time an inhibit signal on lines 551, 552, and 554 and no inhibit signal on line 553. At T3 time a signal is applied to line 53 fully conditioning AND gate 282 to generate an output signal on line 462 which is applied through OR gate 447 to line 472 to cause a read-write access to position 2 for Program II in mask memory 480. During the read portion of this access the contents of this memory position (which at this time should be all zeroes) is applied to mask memory 580 (FIG. 2B). This however has no effect on the subsequent operation of the circuit. During the write portion of the read-write cycle the desired mask which has been applied to the inhibit inputs is stored in the accessed memory position. This mask has a one in the third bit position corresponding to the propram *j* and zeros in the other bit positions.

The signal on CONN line 85 is also applied through OR gate 110 (FIG. 2A) and line 182 to one input of AND gate 184. At T4 time this AND gate is fully conditioned to generate an output signal on line 186 which is applied through OR gate 188 and line 190 to CPU 50 to cause the CPU to proceed with normal program operation.

Nothing further happens in the inter-program communication operation until, at a later time, program *j*, Program III for the example chosen, is running in CPU 50. If this program is of the type which is capable of communicating with other programs, it will have CHEK and SENSE instruction interspersed in its program sequence. When such a CHEK instruction is applied to instruction register 58 (FIG. 2A), it may be seen from the second line of FIG. 3A that the codes appearing therein cause instruction decoder 82 to generate an output signal on line 86, and A address decoder 94 (FIG. 2C) to generate an output signal on line 98. The signal on line 86 is applied as one input to AND gate 130 (FIG. 2B). At T1 time this AND gate is fully conditioned to generate an output signal on line 332 which is applied to reset accumulator 330. This signal on line 86 is also applied through OR gate 112 and line 192 to one input of AND gate 198, a second input to this AND gate being the beforementioned output line 98 from A address decoder 94. At T2 time AND gate 198 is fully conditioned to generate an output signal on line 203 which signal causes a read-write access to the third row of crossbar matrix 20. The resulting output signals on sense lines 321–324 are applied to the information inputs of gates 296–299 and 126–129 (FIG. 2B). Since none of the inverters 261–264 have inputs applied to them at this time, gates 296–299 are fully conditioned to pass the signals on sense lines 321–324 through OR gates 266–269, inverters 311–314, and OR gates 221–224 to the inhibit inputs of the core matrix. During the write portion of the read-write access the contents of the third row of the crossbar matrix are in this manner, restored. Non-destructive read out of this memory is thus achieved. The signal on line 86 conditions gates 126–129 to pass the signals on sense lines 321–324 to accumulator 330. The contents of the third row of crossbar matrix 20 is in this manner transferred to accumulator 330.

At the end of T4 time the CPU applies the SENSE instruction which always follows a CHEK instruction to instruction register 58. During this SENSE instruction which is shown on the third line of FIG. 3A, program *j* is attempting to determine if any program *i* is trying to communicate with it and also whether the program *i* is one which it is willing to communicate with. The presence of the SENSE instruction in instruction register 58 causes operation decoder 82 (FIG. 2A) to generate an output signal on SENSE line 89 and causes A address decoder 94 to generate an output signal on line 98. The mask for the calling stations which the receiving station is willing to communicate with is stored in the first memory position for each program in mask memory 480. The signal on line 89 is applied as one input to AND gates 156–159 (FIG. 2B) and as one input to AND gate 168 (FIG. 2E). A second input to AND gate 168 is output line 98 from A address decoder 94. Since both the write and read flip-flops for Program III in function register 240 are in their ZERO state, signals appear on line 363 and 378 to fully condition AND gate 168. The resulting output signal on line 488 is applied as one input to AND gate 498 (FIG. 4D) and through OR gate 490 (FIG. 2F) and line 502 as one input to AND gates 504 and 506 (FIG. 2D). At T1 time a signal appears on line 51 fully conditioning AND gate 498 to generate an output signal on line 528 which causes the desired mask to be read out on sense lines 576–579. The signals on lines 576–579 are applied to mask register 580 (FIG. 2B) and are also applied to the information inputs of gates 536–539. The signal on T1 line 51 also fully condition AND gate 506 to generate an output signal on line 532 which conditions gates 536–539 to apply the inverted signals from sense line 576–579 to the inhibit inputs of mask memory 480 thereby causing the mask to be re-written into the proper position of memory 480 during the write half of the read-write memory cycle.

At T2 time a signal is applied through line 52 to a second input of AND gates 156–159 (FIG. 2B). If there is a bit in the corresponding position of accumulator 330 and mask register 580 at this time, the corresponding AND gate is fully conditioned to generate an output signal on the appropriate one of the lines 591–594. At this time accumulator 330 is generating an output signal on line 337. If it is assumed that Program III is willing to accept information from Program II, mask register 580 is at this time generating an output signal on line 587 which fully conditions AND gate 157 to generate an output signal on line 592 which is applied to encoder 595 and through OR gate 596 to line 602. Encoder 595 converts the signal on line 592 into the code for the second program and applies this code to 2T delay 598. At the end of T4 time this code is applied through lines 600 and OR gate 68 to the A address position in instruction register 58. The signal on line 602 is applied to condition gates 92 (FIG. 2A) to gate the code for Program III (program *j*) which is stored in the address A position of instruction register 58 into 2T delay 608. At the end of T4 time this code is applied through lines 610 and OR gate 74 to the address B position in the instruction register. The signal on line 602 is also applied to fully condition AND gate 504 (FIG. 2F) to generate an output signal on line 616 which is applied to cause the CONN instruction code stored in read only memory 622 to be read out through lines 624 into 2T delay 626. At the end of T4 time this code is applied through lines 628 and OR gates 62 (FIG. 2A) to the instruction field of instruction register 58. The next instruction to be executed, the instruction shown on line 4 of FIG. 3A, is in this manner applied to instruction register 58.

If the mask in register 580 at T2 time did not have a bit in its second position, indicating that program III did not wish to accept information from program II, none of the AND gates 156–159 would have been fully conditioned and there would therefore have been no signal on line 602. Under these conditions inverter 604 generates an output signal on line 612 which, in conjunction with the SENSE signal on line 89 and a T2 signal on line 52 fully conditions AND gate 162 to generate an output signal on line 614 which is applied through OR gate 188 (FIG. 2A) and line 190 to CPU 50 to indicate that Program III should continue with its normal instruction sequence. The CPU may take any other appropriate action in response to the signal on line 614 such as, for example, resetting the C*ji* bit in matrix 20 or informing the *i* program that the *j* program does not wish to communicate with it.

Now that the receiving program has decided that it is willing to accept information from the sending program, it must so inform the sending program. This is accomplished by the CONN instruction shown on line 4 of FIG. 3A by setting the C*ij* bit in crossbar core matrix 20 (FIG. 2C). For the illustrative example which has been chosen, when the CONN instruction is in instruction register 58, operation decoder 82 generates an output signal on line 85, A address decoder 94 (FIG. 2C) generates an output signal on line 97, and B address decoder 102 generates an output signal on line 108. The signal on line 97 combines with a T2 signal on line 52 and the signal on line 192 from OR gate 112 to fully condition AND gate 197 to generate an output signal on line 202 which causes an access to the second row (the *i* row) of matrix 20. The signal on line 108 from B address decoder 102 combines with the signal on CONN line 85 to fully condition AND gate 118 to generate an output signal on line 258 which, in combination with the absence of a signal on lines 256, 257, and 259, causes bits to appear on inhibit lines 226, 227, and 229 during the write portion of the read-write cycle in a manner previously described thereby permitting a bit to be stored only in the C23 (C*ij*) position of crossbar matrix 20. At this time, write 2 flip-flop 237 is set to its ONE state causing an output signal on line 352 which is applied to the information input of gate 357. The signal on output line 97 from A address decoder 94 conditions this gate to generate an output signal on line 397 which is applied through OR gate 402 and line 412 to one input of AND gate 278. The signal on line 258 and a signal on T2 line 52 fully conditions AND gate 278 to generate an output signal on line 348 which switches read 3 flip-flop 48 to its ONE state. The read *j* flip-flop of function register 240 is in this manner set to its ONE state. The signal on line 412 is also applied to one input of AND gate 288 (FIG. 2D). The signal on CONN line 85 is also applied to condition gates 121–124 (FIG. 2F) to pass the *i* address output from A address decoder 94 (this being a one bit on line 97 and a zero bit on the remaining lines) through lines 556–559, OR gates 561–564 (FIG. 2D), inverters 566–569, and OR gates 546–549 to inhibit lines 551–554 of mask memory 480. This results in inhibit signals being applied to lines 551, 553, and 554, and no inhibit signal being applied to line 552. The output signal on line 258 from AND gate 118 (FIG. 2C) and a signal on T3 line 53 fully conditions AND gate 288 (FIG. 2D) to generate an output signal on line 468 which is applied through OR gate 458 to access-line 478 for the third word for Program III in mask memory 480. This word, which should be all zeros at this time, is read out into mask register 580 during the read portion of the cycle and, because of the manner in which the inhibit lines are energized, as indicated previously, a one bit is stored in the second position of this word and zero bits in the remaining positions of this word during the write portion of the read-write cycle. The use to which the mask which is stored in this manner is put will be described later.

Once the *j* program has indicated that it is willing to accept information from the *i* program, nothing further happens until the *i* program is again running on CPU 50. The *i* program, like the *j* program, has CHEK and SENSE instructions interspersed in its instruction sequence. When while program *i* is running in CPU 50, a CHEK instruction (line 5 of FIG. 3B) is applied to instruction register 58 (FIG. 2A), instruction decoder 82 again generates an output signal on line 86 and A address decoder 94 generates an output signal on line 97. As before, the signal on line 86 is applied through OR gate 112 to line 192 to, in conjunction with the signal on line 97 and a T2 signal on line 52, fully conditioning AND gate 197 (FIG. 2C) to generate an output signal on line 202 causing the second row in crossbar matrix 20 to be read out on to sense lines 321–324. The signal on line 86 also conditions AND gate 130 (FIG. 2B) to reset accumulator 330 at T1 time and conditions gates 126–129 to pass the bits on sense lines 321–324 into accumulator 330. The contents of the word in crossbar matrix 20 corresponding to the second program (i.e., the *i* program) is in this manner transferred into accumulator 330. From previous discussion it will be remembered that the first, second and fourth bits of this word are zero and the third bit of this word is a one. Since there are no signals on any of the lines 256–259, inverters 261–264 (FIG. 2C) are all generating outputs to condition gates 296–299 to pass the signals on sense lines 321–324 in inverted form to inhibit lines 226–229. During the write portion of the read-write cycle the second word in crossbar matrix 20 is therefore restored.

The CHEK instruction is followed in instruction register 58 by the SENSE instruction shown on line 6 of FIG. 3B. From column G of FIG. 3B it is seen that one of the functions of this instruction is to determine if the C*ij* bit has been set by the *j* program. As preliminary operation the mask which was stored in the second word of the Program II portion of mask memory 480 must be read into mask register 580. Once this mask has been used, it may be reset.

To accomplish these functions, the signal on sense line 89 is applied as one input to AND gate 172 (FIG. 2E) a second input to this AND gate being output line 97 from A address decoder 94. The final input to this AND gate is output line 352 from the ONE side of write 2 flip-flop 257 of function register 240. It will be remembered that this flip-flop was set to its ONE state during the CONN operation shown on line 1 of FIG. 3A. AND gate 172 is therefore fully conditioned to generate an output signal on line 422 which is applied as one input to AND gate 427 and through OR gate 508 to line 512. At T1 time AND gate 427 is fully conditioned by the signal on T1 line 51 to generate an output signal on line 442 which is applied through OR gate 447 (FIG. 2D) to line 472 to cause the desired mask entry to be read out of mask memory 480 onto lines 576–579. The signals on lines 576–579 are applied to mask register 580 (FIG. 2B). The signal on line 512 is applied through OR gate 516 (FIG. 2F) and line 522 to one input of AND gate 524

(FIG. 2D) the other input to this AND gate being T1 line 51. The resulting output signal on line 542 is applied through OR gates 546–549 to cause inhibit signals to appear on inhibit lines 551–554. During the write portion of the mask memory read-write cycle all bits of the mask which was just read out are therefore reset to zero.

The signal on SENSE line 89 is also applied as one input to AND gates 156–159 (FIG. 2B). A second input to each of these AND gates is T2 line 52. Since both accumulator 330 and mask register 580 have a bit stored in their third position, signals appear on lines 338 and 588 fully conditioning AND gate 158 to generate an output signal on line 593 which is applied to encoder 595 causing the code for program number III to be applied through lines 597 to 2T delay 598. At the end of T4 time signals are applied through lines 600 and OR gates 68 (FIG. 2A) to cause this address to be applied to the address A field of instruction register 58. The signal on line 593 is also applied through OR gate 596 to line 602. The signal on line 602 is applied to condition gate 92 (FIG. 2A) to pass the address in the address A field of register 58 to the address B field of this register at the end of T4 time. The signal on line 602 is also applied to one input of AND gate 516 (FIG. 2F), the other input to this AND gate being the beforementioned signal on output line 512 from OR gate 508. The resulting output signal on line 618 causes the TALK instruction stored in the second address of read only memory 622 to be read out into 2T delay 626. At the end of T4 time this instruction is applied through lines 628 and OR gates 62 (FIG. 2A to the instruction field of instruction register 58. Therefore, at the end of T4 time, the TALK instruction shown on line 7 of FIG. 3 is stored in instruction register 58.

If there had not been a bit in the third bit position of accumulator 330, indicating that program *j* had not yet accepeted the call from program *i*, at T2 time AND gate 162 (FIG. 2B) would be fully conditioned, in a manner previously described, to cause CPU 50 to continue with the normal program *i* sequence.

As may be seen from line 7 of FIG. 3B, when the TALK instruction is in instruction register 58, the C*ji* bit in crossbar matrix 20 is reset, the write *i* flip-flop in function register 240 is reset, and the data which program *i* wishes to transfer to program *j* is transferred from main memory 22 into the *j* portion of buffer 24. To effect these operations the signal on TALK line 87 is applied as one input to AND gate 132 (FIG. 2A), through OR gate 112 and line 192 as one input to AND gate 198, through OR gate 135 and line 205 as one input to AND gates 207 and 212, through OR gate 110 as one input to AND gate 184 and as one input to AND gate 138 (FIG. 2B). A address decoder 94 is generating an output signal on line 98 at this time and B address decoder 102 is generating an output signal on line 107. At T2 time the signal on line 98 and the signal on line 52 combine to fully condition AND gate 198 (FIG. 2C) to generate an output signal on line 203 which causes a read-write access to the third address position in crossbas matrix 20. At this same time the signal on line 107 fully conditions AND gate 212 (FIG. 2A) to generate an output signal on line 217 which is applied through OR gate 222 to inhibit line 227. Therefore, during the write portion of the access to the third row (the *j* row) of the crossbar matrix the writing of the C*ji* (C32) bit is inhibited resulting in this bit being reset. The signal on line 107 also combines with the T2 signal on line 52 to fully condition AND gate 132 (FIG. 2A) to generate an output signal on line 232 which is applied to the ZERO-side input of write-2 flip-flop 237 (FIG. 2E) causing this flip-flop to be reset to its ZERO state. The signal on output line 107 from B address decoder 102 fully conditions AND gate 207 (FIG. 2B) to generate an output signal on line 207A which is applied to condition gate 217 to pass the address in main memory 22 at which the data which program *i* wishes to transfer is stored, which address is stored in the second program register 79, to address input 220 of main memory 22. The program register may be loaded from CPU 50 under control of program *i* in any standard manner. The signal on output line 98 from A address decoder 94 combines with the T2 signal on line 52 to fully condition AND gate 138 (FIG. 2B) to generate an output signal on line 633 which conditions gate 638 to pass the output from the address indicated on lines 220 in main memory 22 into the third portion (i.e., the *j* portion) of buffer 24. At T4 time, AND gate 184 (FIG. 2A) is fully conditioned to generate an output signal on line 186 which is applied to cause CPU 50 to resume its normal program sequence.

When the TALK instruction has been completed, the message which it is desired to transfer is stored in the *j* portion of buffer 24. It is now desired to transfer this information into the *j* program area of main memory 22. This is accomplished under control of the *j* program. In order for the *j* program to accomplish this operation it must first determine whether the desired information has been transferred into its buffer. The first step in making this determination occurs when a CHEK instruction (line 8, FIG. 3B) is applied by program *j* (Program III for the example chosen) to instruction register 58. When this occurs, the resulting signal on CHEK line 86 causes accumulator 330 (FIG. 2B) to be reset at T1 time and the resulting signals on lines 192 and 98 fully condition AND gate 198 (FIG. 2C) at T2 time to generate an output signal on line 203 which causes the contents of the third word in crossabr matrix 20 to be read out onto sense lines 321–324 and to be nondestructively written back into this address position. The signals on lines 321–324 are gated under control of the signal on CHEK line 86 into accumulator 330. Since the C*ji* bit was reset during the TALK instruction shown on line 7 of FIG. 3B, all zeros should be read to accumulator 330 at this time.

The CHEK instructions shown on line 8 of FIG. 3B is followed in instruction register 58 by the SENSE instruction shown on line 9 of this figure. During this SENSE instruction a decision is made as to whether the C*ji* bit has been reset and, if it has been reset, a LISTEN instruction is applied to instruction register 58. At this time read-3 flip-flop 248 (FIG. 2E) of function register 240 is in its ONE state causing a signal to appear on line 373 and A address decoder 94 is generating an output signal on line 98. These signals combine with the signal on SENSE line 89 to fully condition AND gate 178 to generate an output signal on line 433 which is applied as one input to AND gate 438 and through OR gate 510 to line 514. The signal on line 514 is applied as one input to AND gate 164 (FIG. 2F), the other inputs to this AND gate being SENSE line 89 and T1 line 51. At T1 time this AND gate therefore generates an output signal on line 520 which is applied to complement the contents of accumulator 330 (FIG. 2B). Therefore, if the accumulator contains all zero bits, which it should at this time, the signal on line 520 changes the contents of the accumulator to all one bits. The signal on line 514 is also applied through OR gate 516 (FIG. 2F) and line 522 to one input of AND gate 524 (FIG. 2D). At T1 time AND gates 438 and 524 are fully conditioned to generate output signals on lines 453 and 542 respectively. The signal on line 453 is applied through OR gate 458 (FIG. 2D) to line 478 to cause a read-write access to the third memory position for Program III in mask memory 480. This word is, therefore, read out through lines 576–579 into mask register 580 (FIG. 2B). The signal on lines 542 is applied through OR gates 546–549 to inhibit lines 551–544 causing the accessed positon in the mask memory to be reset during the write portion of the read-write cycle. At T2 time, when a signal is applied through line 52 to condition AND gates 156–159 (FIG. 2B), accumulator 330 should contain all one bits and mask register 580 a bit in its second position. Under these conditions AND gate 157 (FIG. 2B) is fully conditioned to generate an output signal on line 592 which is applied to encoder 595 causing the code for Program II to be applied to 2T delay 598. At the end of T4 time this code is applied through OR gates 68 to the address A field of instruction register 58 (FIG. 2A). The signal on line 592 is also applied through OR gate 596 and line 602 to cause the $j$ address in the A field of instruction register 58 to be applied to the address B field of this register at the end of T4 time and to one input of AND gate 518 (FIG. 2F). The beforementioned signal on output line 514 from OR gate 510 fully conditions AND gate 518 at this time to generate an output signal on line 620 which causes the LISTEN instruction stored in the third address position of read only memory 622 to be read out into 2T delay 626. At the end of T4 time this instruction is applied to the instruction field of instruction register 58. The LISTEN instructon shown on line 10 of FIG. 3B is in this manner set into instruction register 58.

If the $Cji$ bit had not been reset when the SENSE instruction shown on line 9 of FIG. 3B was in instruction register 58, a one bit would initially have been in the second address position in accumulator 330 and the complementing of this accumulator would have caused a zero bit to be stored in this address position. Under these conditions, none of the AND gates 156–159 would have been fully conditioned and inverter 604 would have generated an output signal on line 612 fully conditioning AND gate 162 to generate an output signal on line 614 which would have been applied through OR gate 188 (FIG. 2A) to CPU 50 to cause the normal program $i$ sequence to be resumed. The program would have proceeded in a normal manner until a CHEK-SENSE sequence was again generated by program $j$ and a determination again made whether the $Cji$ bit had been reset.

The main purpose of the LISTEN instruction shown in line 10 of FIG. 3B is to transfer the data stored in the $j$ portion of buffer 24 into the proper position in main memory 22. Other functions which are performed are the resetting of the $Cij$ bit in the crossbar matrix 20 and the resetting or the read-$j$ flip-flop in function register 240. To effect these operations, the LISTEN instruction on line 88 is applied as one input to AND gate 143 (FIG. 2A), through OR gate 112 to line 192, through OR gate 135 to line 205, through OR gate 110 to line 182, and as one input to AND gates 146–149 (FIG. 2B). At this time A address decoder 94 is generating an output signal on line 97, and B address decoder 102 is generating an output signal on line 108. The signal on line 97 combines with the signal on line 192 too, at T2 time, fully conditioning AND gate 197 to generate an output signal on line 202 which causes a read-write acces to the second word (i.e., the $i$ word) in the crossbar matrix 20. The signal on line 108 combines with the signal on line 205 to fully condition AND gate 213 (FIG. 2A) to generate an output signal on line 213A which is applied through OR gate 223 to inhibit line 228. During the write portion of the read-write access the C23 ($Cji$) bit in the crossbar matrix is therefore reset. At T2 time the signal on line 108 fully conditions AND gate 143 (FIG. 2A) to generate an output signal on line 243 which is applied to the ZERO-side input of read-3 flip-flop 248 (FIG. 2E) to reset this flip-flop to its ZERO state. Finally, at T2 time, the signal on line 108 is applied to fully condition AND gate 148 (FIG. 2B) to generate an output signal on line 668 which conditions gate 663 to pass the data stored in the Program III (program $j$) portion of the buffer 24 through lines 672 to main memory 22. The signal on line 205 combines with the signal on line 108 to cause AND gate 208 to condition gate 218 to pass the address at which the information on lines 672 is to be stored from the third of the address registers 79 to main memory address lines 220. The information is thus stored in the desired position for program $j$ in main memory 22. At T4 time AND gate 184 is fully conditioned to generate an output signal on line 186 which causes CPU 50 to resume its normal program sequence.

At the end of T4 time of the LISTEN instructions shown on line 10 of FIG. 3B, crossbar matrix 20 is again completely reset, all the flip-flops of function register 240 are again set to their ZERO state, buffer 652 is empty, and the second and third word positions for each of the programs in mask memory 480 are again reset. The circuit is therefore ready to begin a new attempt to send a message between a program $i$ and a program $j$.

SOFTWARE EMBODIMENT

While in some applications the amount of inter-program or inter-terminal communication may justify the provision of special purpose hardware for accomplishing these functions, for many applications it will not be economically feasible to do this. For these applications the system shown in FIG. 1 may be embodied by using a portion of the megnetic core memory of a general purpose digital computer as crossbar matrix 20, and programming the general purpose computer to perform the functions of general processing circuit 10 and transfer control circuit 16. A program for performing these functions has been written in FAP language for the IBM 7090 computer. Table I shows the pertinent instructions in 7090 FAP language for performing the desired message transfer operation, and also indicates the general function being performed by each of these instructions.

TABLE I

| Program Running | 7090 FAP Instruction | Function |
|---|---|---|
| $i$ | CONN $i$ | Signal desired to send message to program $j$ by setting $Cji$ bit in crossbar matrix. |
| | ------------------<br>------------------ | normal $i$ program sequence. |
| $j$ | CHEK | Set $Ci$ into accumulator. |
| | TZE*+5 | Test for cal to $j$ program and branch to normal $j$ program sequence if no call. |
| | SLW $i$ | Store calling program ($i$) at address $i$. |
| | ERA Mj<br>TZE*+2 | Test if calling program is one which receiving program is willing to communicate with and branch to normal $j$ program sequence if not. |
| | CONN $i$ | Indicate willingness to accept information by setting $Cij$ bit in crossbar matrix. |
| | ------------------<br>------------------ | normal $j$ program sequence. |
| $i$ | CHEK | Set $Ci$ into accumulator. |
| | ANA $j$<br>TZE*+2 | Test for $Cij$ set and branch to normal $i$ program sequence if not get. |
| | TALK $i+1$ | Send message to $j$ portion of buffer Reset $Cji$. |
| | ------------------<br>------------------ | normal $i$ program sequence. |
| $j$ | CHEK | Set $Cj$ into accumulator. |
| | ANA $i$<br>TNZ*+2 | Test for $Cji$ reset and branch to normal $j$ program sequence if not reset. |
| | LISTEN $i+1$ | Read message out of $j$ portion of buffer. Reset $Cij$. |
| | ------------------<br>------------------ | normal $j$ program sequence. |

Where $j$ is the address in memory where the number of the program being called is stored.

Where $i$ is the address in memory where the number of the calling program is stored.

Where $j+1$ is the address in memory where the message being sent is to be stored.

Where $i+1$ is the address in memory where the message being sent is initially stored.

Where M$j$ is the address in memory where the mask for programs acceptable to program $j$ is stored. Referring to Table I it is seen that, as in FIG. 3A the message transfer operation is initiated when program $i$ is running and generate a CONN instruction. The CONN instruction causes the *Cji* bit in the crossbar matrix portion of the main memory to be set. The system then resumes the normal *i* program sequence. The next step in the operation is as in FIG. 3A, for program *j* to issue a CHEK instruction. This causes the *Cj* row in matrix 20 to be read into the computer accumulator. It is noted that the program does not contain a SENSE instruction as the hardware embodiment did but, instead, substitutes a number of 7090 instructions to perform this function. The CHEK instruction is followed by a test for zeros (TZE) instruction which determines if there have been any calls for the *j* program (i.e., test to determine if the accumulator is empty) and causes a branch to the normal *i* program sequence if the accumulator is empty. The program then stores a designation of the calling program at an address *i* in memory. This is accomplished by the SLW instruction. This operation is the equivalent of the mask storing operation which was performed during the initial CONN instruction in the hardware embodiment. The next step in the program is to exclusive-OR the contents of the accumulator with the mask of acceptable programs for program *j* and to then test to see if the contents of the accumulator are all zero. If the contents of the accumulator are not zero at this time, it indicates that an acceptable calling program is attempting to communicate with program *j* and program *j* therefore proceeds to issue a CONN instruction. With the exception of the SLW instruction, the four instructions preceding the CONN instruction in Table I perform the equivalent function to the SENSE instruction shown on line 3 of FIG. 3A. It will be remembered from the description of the hardware embodiment that this instruction sets a mask of acceptable programs for program *j* into a mask register and compares this with the contents of the accumulator (an exclusive-OR operation is, in effect, a comparison) and causes a CONN instruction to be generated if the comparison is successful. It should also be noted at this point that the ERA and the TZK instruction following it are optional and may be eliminated if the ability to block information from undesired terminals is not required. As in the hardware embodiment, the CONN instruction in Table I indicates the *j* program's willingness to accept information by setting the *Cji* bit in the crossbar matrix. After the CONN instruction, the *j* program proceeds with its normal sequence.

Again, as in the hardware embodiment, the next significant operation is the generation of a CHEK instruction by the *i* program. This, as in the hardware embodiment, causes the *i* row in the crossbar matrix to be set into the accumulator. The program then AND's the contents of the accumulator with a word with a bit in the *j* position which is stored at address *j* in memory, and tests to see if the accumulator is zero. This is equivalent to the SENSE operation performed on line 6 of FIG. 3B which brings the same word as that stored at address *j* into a mask memory and compares it with the contents of the accumulator. If the result of the test-for-zero operation is that the accumulator is now set to zero, this means that there is not a bit in the *Cij* position of the crossbar matrix, and the program branches to the normal *i* program sequence. If the accumulator is not all zeros at this time, program *i* proceeds to issue a TALK instruction. As in the hardware embodiment, this causes the desired message to be stored in the *j* portion of buffer 24 and also causes the *Cji* bit in the crossbar matrix to be reset. After the TALK instruction, program *i* resumes its normal program sequence.

The final sequence of operation occurs when the *j* program is again running in the computer. It will eventually issue a CHEK instruction causing the *j* row in the crossbar matrix to be set into the accumulator. The system then tests to determine if the *Cji* bit has been reset by ANDing a word which contains a bit at only the *i* position, which word is stored at address *i* in the memory, with the contents of the accumulator and testing to determine if the contents of the accumulator are not zero. If the contents of the accumulator are not zero at this time, it means that the *Cji* bit has not been reset and the program branches to the normal *j* program sequence. If the *Cji* bit has been reset, then the accumulator is set to zero and the program *j* proceeds to issue a LISTEN instruction. The above sequence of operations is equivalent to that which occurred when the SENSE instruction shown on line 9 of FIG. 3B is generated. This instruction caused the contents of the accumulator to be complemented and then compared against a mask which is the same as that stored in address *i*. The effect of these operations is to compare for a not zero condition. The LISTEN instruction, as for the hardware embodiment, causes the message stored in the *j* portion of buffer 24 to be read into main memory 22 at the address $j+1$. The LISTEN instruction also causes the resetting of the *Cij* bit in the crossbar matrix. At the end of the LISTEN instruction the normal *j* program sequence is resumed.

The TZE, the SLW, the ERA, the ANA, and the TNZ instructions shown in Table I are all standard IBM 7090 instructions and it is not felt that anything further need be said about them. Further information on these instructions may, for example, be obtained from the systems manual for the IBM 7090 computer. The CONN, CHEK, TALK, and LISTEN instructions are, however, pseudo-instructions which will require further discussion. These instructions have been coded so that the system interrupts them as a STORE and TRAP instruction and proceeds to execute a STORE and TRAP subroutine. This subroutine starts at address 00002 and initially performs a number of housekeeping functions. The program instructions in 7090 FAP language for performing these operations are shown in Table II. The final step in the housekeeping operation is to interrupt which of the possible pseudo-instructions which are interrupted as a STORE and TRAP instruction, has in fact been generated and to branch to the subroutine for that instruction. A partial list of the subroutines which may be branched to during this step, including the CONN, TALK, LISTEN, and CHEK subroutines, is included at the end of Table II. The final step in the operation shown in Table II is for the program to branch to the subroutine for the interrupted instruction.

TABLE II

| Address | Instruction | | Function |
|---|---|---|---|
| 00002 | TTR | PSTR | 02 STR EXECUTE |
| PSTR | SRI | STA4 | WAS SUPERVISØR |
| | NZT | STA4 | RUNNING? |
| | TRA | ERRØ | YES. DIRECT TØ ERRØR |
| | STQ | STA1 | NØ. NØRMAL TRAP |
| | LDQ | *+2 | X |
| | TTR | STAK | X |
| | PZE | SUDØ,,O | X |
| STAK | LTM | | LEAVE TRAP MØDE |
| | STØ | STA2 | SAVE ACC AND |
| | ARS | 1 | IX REGS |
| | STP | STA3 | X |
| | SXA | STA4,1 | X |
| | SXD | STA4,2 | X |
| STAK1 | CAL | ALLBIT | SET TØ ENABLE |
| | SLW | ENBWD | ALL TRAPS |
| STAK2 | XCA | | GET TRAP IO |
| | PDC | ,2 | STØ ADDR TØ IX |
| | LXA | TRP1I,1 | TRAP STACK ADDR |
| | STØ | O,1 | PRØC ADD TØ STACK |
| | CAL | O,2 | CØNTENTS ØF "STØRE |
| | SLW | 1,1 | IN" TØ STACK |
| | TXI | *+1,1,-TRP1E | UPDATE STACK |
| | TXH | *+2,1,-TRP1L | INPUT PØINTER |
| | AXC | TRP1,1 | X |
| | SXA | TRP1I,1 | X |
| | STA | STA5 | SAVE LØC CTR |

| | | | |
|---|---|---|---|
| PTER3 | STZ | STA6 | SAVE ØV IND |
| | TNØ | *+2 | X |
| | STL | STA6 | IND WAS ØN |
| | CAL | 1XO1 | SET BIT TØ ASSURE ØV IND TURN-ØN |
| | LDQ | STA3 | X |
| | LGL | 2 | X |
| | LDQ | STA2 | X |
| | LLS | 35 | X |
| | NZT | STA6 | REST ØV |
| | TØV | *+1 | X |
| | LDQ | STA1 | RESTØRE MQ |
| | LXA | STA4,1 | RESTØRE |
| | LXD | STA4,2 | 1X REGS |
| | SRI | STA4 | TEST RELØC REGS |
| | ZET | STA4 | FØR ZERØ |
| | TRA | SAVE | SUPER NØT TRAPPED |
| | TXH | *+2,4,-IDLE | IDLING? |
| | TXH | RTRN,4,-IDLE-1 | YES. TEST STACK |
| | ENB | ENBWD | SUPER ØPERATING |
| | TRA* | STA5 | AND RETURN |
| SUDØ | STØ | SUD2 | SAVE TRAP |
| | TSX | INDX,4 | SET 1X1,2 |
| | CAL | 3,2 | GET ADDRESS ØF SUDØ |
| | SUB | 1XO1 | X |
| | ADD | RELØC,2 | X |
| | PAC | ,4 | X |
| | LDI | O,4 | GET SUDØ |
| | PIA | | PSEUDØ-INSTR ØP CØDE TØ XR4 |
| | ARS | 9 | X |
| | ANA | BUFFM | X |
| | PDX | ,4 | X |
| | SXA | SUD3,4 | SAVE IT. |
| | TXL | STRR,4,O | SEPARATE USER STR INSTRUCTIØNS |
| | TXL | SUDØ,4,9 | FROM PSEUDØ-INSTRUCTIØNS. STR'S |
| | TXL | STRR,4,16 | WITH C(3-8)=1-9,17-20,33-37, |
| | TXL | SUDØ1,4,20 | ØR 40 |
| | TXL | STRR,4,32 | ARE PSEUDØ-INSTRUCTIØNS. |
| | TXL | SUDØ1,4,37 | ALL ELSE ARE NØRMAL STR |
| | TXL | STRR,4,39 | INSTRUCTIØNS. |
| | TXL | SUDØ1,4,40 | X |
| | TRA | STRR | X |
| SUDØ1 | SLF | | |
| | SLN | 3 | |
| | TSX | EFFA,4 | |
| | STA | SUD1 | |
| | LXA | SUD3,4 | |
| | TXL | SUPV,4,1 | |
| | TXL | WAIT,4,2 | |
| | TXL | CONN,4,3 | |
| | TXL | TRNØ,4,4 | |
| | TXL | TALK,4,5 | |
| | TXL | LISN,4,6 | |
| | TZL | CHEK,4,7 | |

The subroutine for the TALK instruction is shown in Table III, the subroutine for the LISTEN instruction in Table IV, the subroutine for the CONN instruction in Table V, and the subroutine for the CHEK instruction in Table VI. Table VII shows a number of miscellaneous subroutines most of which are called for during the execution of the TALK, LISTEN, CONN, and CHEK subroutines. Referring to Table VII, the ICØL subroutine causes the column in the crossbar matrix for the program being run to be transferred to the accumulator, the IRØW subroutine causes the row in the crossbar matrix for the running program to be transferred to the accumulator, and the ØRØW subroutine causes the row for the other program which is involved in the transfer to be set into the accumulator. The TALKR and the LINSR subroutines are used to reset the appropriate bits in the crossbar matrix. The operations headed X-bar communication table starting at address XBRIE and ending at the address following XBRI form the subroutine used for allocating a section of the computer core storage for the crossbar matrix function. This subroutine need be performed only once when it is determined that the computer is going to be used for performing the program intercommunication function. The other subroutines shown in Table VII are used for performing miscellaneous housekeeping operations.

TABLE III

| Address | Instruction | | Function |
|---|---|---|---|
| TALK | CAL | ØTERM,2 | ØBJECT RØW |
| | PDC | ,2 | X |
| | TXI | *+1,2,-XBR1 | X |
| | TSX | ICØL,4 | ISSUE CØL. |
| | ANA | O,2 | X |
| | TZE | TALK2 | NØ CØNNECTIØN |
| | TXI | *+1,2,XBR1 | ØBJECT CØLUMN |
| | CAL | SBIT | X |
| | ARS | O,2 | X |
| | TSX | IRØW,4 | ISSUE RØW |
| | ANA | O,2 | |
| | TNZ | *+2 | |
| TALK2 | STR | NØCØN | NØ CØNNECTIØN |
| | TSX | PØSX,4 | RESTØRE IX2 |
| | CAL | IXO3 | STØRE ØP |
| | TSX | CMØP,4 | AND CMD ADDR IN PØST |
| | TSX | ØTST,4 | SET IX1 TØ ØBJ TERM |
| | TSX | SMSG,4 | SEND MSG |
| | TRA | TALK1 | TØØ BIG |
| | CAL | 18BIT | SET MSG IN |
| | STT | 1,1 | MEMØRY BIT |
| | TSX | INDX,4 | ØK. RESET CØMM |
| | TSX | TALKR,4 | MATRIX |
| | TRA | RTRN | AND RETURN |
| TALK1 | CAL | 19BIT | SET MSG ØN |
| | STT | 1,1 | DRUM BIT |
| QTER | TSX | INDX,4 | RESTØRE IX1,4 |
| | TSX | BACK,4 | BACK ØNE |
| | AXC | CPUQ,2 | REM FROM ROY |
| | TSX | REMQ,4 | Q |
| | AXC | DMSQ,2 | ADD TØ MSG Q |
| | TSX | ADDQ,4 | AND |
| | TRA | SEQU | EXIT |

TABLE IV

| Address | Instruction | | Function |
|---|---|---|---|
| LISN | CAL | IXO4 | STØRE ØP AND CMMD ADDR |
| | TSX | CMØP,4 | IN PØST |
| | TSX | WMSG,4 | GET MESSAGE |
| | STR | CPYE | NØNE, ERRØR |
| | TRA | LISN1 | ØK |
| | TRA | QTER | AND EXIT |
| LISN1 | TSX | LISNR,4 | RESET CØMM MATRIX AND |
| | TRA | RTRN | RETURN |

TABLE V

| Address | Instruction | | Function |
|---|---|---|---|
| CØNN | CAL* | SUD1 | IF MACHINE RØØM |
| | ANA | MRMT | TERMINAL MUST |
| | TZE | *+2 | BE SYSTEM PRØGRAM |
| | TSX | SYST,4 | X |
| | TSX | ASUB,4 | SUBCH NØ TØ PØST |
| | TSX | ØRØW,4 | SET BIT IN |
| | TSX | ICØL,4 | ØBJECT RØW |
| | ØRS | O,2 | X |
| | TSX | PØSX,4 | TEST ØBJ. TERM |
| | TSX | OTST,4 | IF ACTIVE, RETURN |
| | LDI | 6,1 | IF INACTIVE |
| | LNT | 100000 | GØ TØ ATTN |
| | TRA | RTRN | X |
| | TRA | ATTN3 | X |

TABLE VI

| Address | Instruction | | Function |
|---|---|---|---|
| CHEK | TSX | IRØW, 4 | READ ØUT ISSUE |
| | LDQ | O, 2 | RØW |
| | TSX | PØSX, 4 | STØRE IN PØST |
| | CLA | 1XOO | ACC |
| | LGL | 35 | AND RETURN |
| | STP | 2, 2 | X |
| | LGL | 1 | X |
| | STØ | O, 2 | X |
| | TRA | RTRN | X |

TABLE VII

| Address | Instruction | | Function |
|---|---|---|---|
| | | RØW AND CØL SUBRØUTINES | |
| ICØL | SXA | ICØ1, 2 | SAVE IX2 |
| | CAL | 5, 1 | CØNST BIT PØINTER |
| | ANA | ACTSC | AT SUBCH= |
| | PDX | ,2 | ØF THIS PRØG |
| | CAL | 1XO1 | X |
| | ALS | 35,2 | X |
| | LXA | ICØ1, 2 | REST IX2 |
| | TRA | 1, 4 | EXIT |

```
IRØW     SLW    ICØ1              SAVE ACC
         CAL    5, 1              SET IX2 TØ
         ANA    ACTSC             WØRD EQ SUBCH
         PDC    ,2                =
         TXI    *+1,2,-XBR1
         CAL    ICØ1
         TRA    1,4

ØRØW     LDQ*   SUD1              FETCH CTRL WØRD
         SLW    ICØ1              SAVE ACC
         AXC    XBR1, 2           SET IX2
         LGL    1                 TØ WØRD INDICATED
         LBT                      BY CØNT WØRD
         TXI    *-2,2,-XBRIE      X
         CAL    ICØ1              REST ACC
         TRA    1, 4              EXIT
-------------------------------------------------------
                 RESET SUBRØUTINE
-------------------------------------------------------
TALKR    SXA    TAL1, 4           RESET

LISNR    EQU    TALKR             CALL ØR
         CAL    ØTERM,2           ANSWER BIT
         PDC    ,2                ØF ØBJECT TERMINAL
         TXI    *+1,2,-XBR1       X
         TSX    ICØL,4            X
         CØM                      X
         ANS    O, 2              X
         LXA    TAL1, 4           X
         TRA    1, 4              X
-------------------------------------------------------
             X-BAR CØMMUNICATIØN TABLE
-------------------------------------------------------
XBRIE    EQU    1                 X
XBRIN    EQU    30                X
XBRIS    EQU    XBRIE*XBRIN       X
XBR1     DUP    1,XBRIS           X
         PZE                      X
-------------------------------------------------------
                   MISCELLANEØUS
-------------------------------------------------------
ASUB     SXA    ASU1, 4           GET CØNTRØL WØRD
         AXT    34, 4             X
         CAL*   SUD1              X
         ANA    LSUBC             MATCH AG LIVE TERMLS
         TZE    ØTST2             ERRØR IF ZERØ
         ARS    1                 CØMPUTE SUBCH NØ
         LBT                      IN IX4
         TXI    *-2, 4, -1        X
         PXD    ,4                AND STØRE IN PØST
         STD    ØTERM, 2          X
         LXA    ASU1, 4           X
         TRA    1, 4              EXIT

SBIT     ØCT    -O                BIT IN SIGN PØS.
NØCØN    EQU    EO55+UERR         NØ CØNNECTIØN
CØRE1    ØCT    000000077400      FIRST CØRE BLØCK
SUD1     PZE                      PRØJECT REGS
-------------------------------------------------------
             SET TST AND PØST INDICES
-------------------------------------------------------
INDX     LXA    CUPR, 1           TST INDEX

PØSX     CAL    4, 1              PØST INDEX
         ANA    CØRE1             X
         PAC    ,2                X
         TRA    1, 4              EXIT

CMØP     ALS    18                STØRE UNRELØC
         ADD    SUD1              ADDR ØF CMMD WD
         SUB    RELØC, 2          PLUS ØP
         SLW    CMDW, 2           IN PØST
         TRA    1, 4              X

SYST     CLA    6, 1              TEST FØR
         TMI    1, 4              SYSTEM ØNLY PSEUDØ
         STR    ILLS              ERRØR
-------------------------------------------------------
```

MODIFICATIONS

In the embodiments of the invention described so far, it has been assumed that both the *i* and *j* programs were running in the computer so that the necessary instructions to complete the connection may be generated or that the necessary instructions are being applied to the system by an active terminal. However, it is possible that a program *i* may wish to communicate with a program *j* which is not, at that time, running in general processing circuit 10 (FIG. 1). It is also possible that a terminal 12 may wish to communicate with another terminal which does not have a program associated with it in general processing circuit 10 and is not, at the time in question, an active terminal. One way in which this problem may be solved is to store a list of programs which are not running or of terminals which are not active and do not have a running program associated with them. When a CONN instruction is issued indicating a desire to send a message to one of the programs or terminals stored in this list, this fact is ascertained by a monitor program in the computer and a subroutine is started to issue the necessary instructions shown either in FIGS. 3A and 3B, or in Table I.

It was mentioned previously that one of the desired functions of the system is to permit certain programs, such as, for example the teacher program in a teaching situation, to have access to all of the programs in the system. This may easily be accomplished by setting the bit corresponding to that program in the mask stored in the first position for each of the programs in mask memory 480 for the hardware embodiment, or the corresponding bit at each of the addresses M*j* for the softwear embodiment to one.

Another problem which has not yet been considered is what happens when an *i* program wishes to communicate with a *j* program which is not willing to accept information from it. One thing which may be done is to energize a clock when a CONN instruction is first issued and to sample this clock after each unsuccessful attempt by the *i* program to determine if its call has been answered. When the clock reaches a predetermined value, the sampling of the clock causes the C*ji* bit to be reset and an indication to be applied to the *i* program that the *j* program does not wish to communicate with it.

While in the description so far, it has been assumed that only a single program *i* is communicating with a single program *j* at any given time, it is possible to either program or design the system so that a program *i* may send a message to several other programs or a program *j* may be receiving messages concurrently from several other programs. To provide this facility in the hardware embodiment of the invention would require a more complex function register 240 (FIG. 2E) which is capable of keeping track of the status of the multiple communications and, in the software embodiment of the invention, would require additional program instructions to perform the multiple-track-keeping functions.

The embodiments of the invention described so far have also provided a row and a column in the crossbar matrix 20 for each of the programs or terminals which may wish to communicate with others in the system. However, in large systems, where there may be several hundred programs or terminals involved, the memory format, particularly for the software embodiment of the invention, does not readily adapt to a one-for-one allocation. It may also be undesirable to use such a large area of high-speed memory for the intercommunication function. One way of solving this problem is to allocate a relatively small section of memory to the intercommunication function and to provide a subroutine in the system which assigns rows and columns in the allocated section to each of the involved programs each time a CONN instruction is generated. Once the communication between the involved programs is completed, the assigned rows and columns are again available to two new programs which wish to communicate with each other.

Another problem with the embodiments of the invention described so far is that they reduce the operating speed of the computer system by requiring it to perform numerous CHEK subroutines when there has been no call for the program involved. One way to solve this problem is to provide a one-bit field or a flip-flop for each program which is set when there is a call for the associated program. When the program starts to run, the one-bit field or the flip-flop is checked and, if it is set, a CHEK-like subroutine is branched to. Otherwise, a CHEK subroutine is never performed.

While the invention has been particularly shown and described with reference to preferred embodiments thereof, it will be understood by those skilled in the art that the foregoing other changes in form and details may be made therein without departing from the spirit and scope of the invention.

What is claimed is:

1. A system for exchanging information between instruction generating media comprising in combination:

a matrix storage device;

means for indicating that a first media wishes to send information to a second media;

transfer means responsive to said indicating means for storing a bit in a first selected position of said storage device;

means operable under control of said second media for interrogating said storage device to determine if there are any bits in it indicating a desire to send information to said second media;

said transfer means being responsive to the detection of a bit by said interrogating means for storing a bit in a second selected position in said storage device;

means operable under control of said first media for interrogating said storage device to determine if a bit is stored in said second selected position;

and means responsive to the detection of a bit in said second selected position for initiating a transfer of information from said first to said second media.

2. A system of the type described in claim 1 wherein said matrix storage device has a row and a column for each instruction generating media in said system;

said first selected position is located at the intersection of the row for said second media and the column for said fisrt media;

and said second selected position is located at the intersection of the row for said first media and the column for said second media.

3. A system of the type described in claim 1 wherein said instruction generating media are computer programs.

4. A system of the type described in claim 1 including:

a buffer storage device having a section for each of said media;

a main memory;

and means, included in part in said transfer initiating means, operative in response to the detection of a bit in said second selected position for transferring the information to be transferred from said main memory to the section of said buffer storage device for said second media.

5. A system of the type described in claim 4 wherein said transferring means includes means for resetting the bit at said first selected position;

and including means operable under control of said second media for determining whether the bit at said first selected position has been reset;

and means responsive to a determination that the bit at said first selected position is reset for transferring the information in the second section of said buffer to said main memory and for resetting the bit at said second selected position.

6. A system of the type described in claim 2 including:

means for storing a mask of the other media which each of said media is willing to accept information from;

means operable under control of said second media at the same time as the interrogating means which is operable under control of said second media for comparing the mask for said second media with the contents of the row of said matrix storage device for said second media;

and means responsive to a mismatch in said comparing means for inhibiting the setting of the bit at the intersection of the row for said first media and the column for said second media.

7. A system for exchanging messages between computer programs comprising:

a crossbar storage matrix having a row and column for each of the programs with the position at the intersection of the *r* row and the *c* column being designated as the C*rc* position;

means for indicating that an *i* program wishes to send a message to a *j* program;

transfer means responsive to said indicating means for storing a bit in the C*ji* position of said crossbar matrix;

means operable under control of said *j* program for interrogating the *j* row of said crossbar matrix to determine if any other program wishes to send a message to the *j* program;

said transfer means responsive to the detection of a bit in the *i* position of the *j* row of said matrix for storing a bit in the C*ij* position of said crossbar matrix;

means operable under control of the *i* program for interrogating the *i* row of said crossbar matrix to determine if a bit is stored in the C*ij* position;

and means responsive to the detection of a bit in the C*ji* position of the crossbar matrix for initiating a transfer of information from the *i* program to the *j* program.

8. A system of the type described in claim 7 including:

means for storing a mask of the other programs which each of said programs is willing to accept messages from;

means operable under control of the *j* program, at the same time that the *j* row of said crossbar matrix is being interrogated, for comparing the mask for said *j* program with the contents of the *j* row of said crossbar matrix;

and means responsive to a mismatch in the *i*-bit position of said comparing means for inhibiting the setting of the C*ij* bit.

9. A system for exchanging messages between computer programs comprising:

a crossbar storage matrix having a row and column for each of the programs with the position at the intersection of the *r* row and the *c* column being designated as the C*rc* position;

means for indicating that an *i* program wishes to send a message to a *j* program;

means responsive to said indicating means for storing a bit in the C*ji* position of said crossbar matrix;

means operable under control of said *j* program for interrogating the *j* row of said crossbar matrix to determine if any other program wishes to send a message to the *j* program;

means responsive to the detection of a bit in the *i* position of the *j* row of said matrix for storing a bit in the C*ij* position of said crossbar matrix;

means operable under control of the *i* program for interrogating the *i* row of said crossbar matrix to determine if a bit is stored in the C*ij* position;

a buffer storage device having a section for each of said programs;

a main memory;

means operative in response to the detection of a bit in the C*ij* position of said crossbar matrix for transferring the message to be transferred from said main memory to the section of said buffer for said *j* program and for resetting the C*ji* bit;

means operable under control of said *j* program for determining whether the C*ji* bit has been reset;

and means responsive to a determination that the C*ji* bit has been reset for transferring the message in the *j* program section of said buffer to said main memory and for resetting the C*ij* bit in said crossbar matrix.

References Cited

UNITED STATES PATENTS

| | | | |
|---|---|---|---|
| 3,225,334 | 12/1965 | Fields et al. | 340—172.5 |
| 3,004,109 | 10/1961 | Lucas et al. | 179—18 |
| 3,286,240 | 11/1966 | Thompson et al. | 340—172.5 |
| 3,299,210 | 1/1967 | Bandy | 340—172.5 |
| 3,331,055 | 7/1967 | Betz et al. | 340—172.5 |

PAUL J. HENON, *Primary Examiner.*

R. B. ZACHE, *Assistant Examiner.*